(12) United States Patent
da Silva et al.

(10) Patent No.: US 11,985,031 B2
(45) Date of Patent: May 14, 2024

(54) OPTIMIZED RECONFIGURATION OF RLM AND BEAM MONITORING PARAMETERS

(71) Applicant: TELEFONAKTIEBOLAGET LM ERICSSON (PUBL), Stockholm (SE)

(72) Inventors: Icaro L. J. da Silva, Solna (SE); Helka-Liina Maattanen, Helsinki (FI); Claes Tidestav, Balsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/109,112

(22) Filed: Feb. 13, 2023

(65) Prior Publication Data
US 2023/0198842 A1 Jun. 22, 2023

Related U.S. Application Data

(63) Continuation of application No. 16/970,624, filed as application No. PCT/IB2019/051200 on Feb. 16, 2018, now Pat. No. 11,582,103.
(Continued)

(51) Int. Cl.
*H04L 41/0813* (2022.01)
*H04L 5/00* (2006.01)
(Continued)

(52) U.S. Cl.
CPC ........ *H04L 41/0823* (2013.01); *H04L 5/0007* (2013.01); *H04L 5/0048* (2013.01);
(Continued)

(58) Field of Classification Search
CPC ............. H04L 41/0813; H04L 41/0823; H04L 5/0007; H04L 5/0048; H04W 24/08; H04W 24/10; H04W 56/001; H04W 72/00
See application file for complete search history.

(56) References Cited

U.S. PATENT DOCUMENTS 11,582,103 B2 * 2/2023 Da Silva .............. H04L 5/0007
2018/0007574 A1 1/2018 Park
(Continued)

FOREIGN PATENT DOCUMENTS

| CN | 105612786 A | 5/2016 |
|---|---|---|
| CN | 105934973 A | 9/2016 |

(Continued)

OTHER PUBLICATIONS

3GPP TS 36.321 V15.0.0 (Dec. 2017) (3rd Generation Partnership Project; Technical Specification Group Radio Access Network; Evolved Universal Terrestrial Radio Access (E-Utra); Medium Access Control (MAC) protocol specification (Release 15) (Year: 2017).*

(Continued)

*Primary Examiner* — Melvin C Marcelo
*Assistant Examiner* — Natali Pascual Peguero
(74) *Attorney, Agent, or Firm* — Ericsson Inc.

(57) ABSTRACT

A method by a wireless device is provided for optimized reconfiguration of radio link monitoring (RLM) and beam monitoring. The method includes receiving, from a first network node, a first message comprising at least one RLM parameter. A second message indicating activation of the at least one RLM parameter associated with the first message is received. The second message is a lower layer signal compared to the first message.

18 Claims, 21 Drawing Sheets

Related U.S. Application Data

(60) Provisional application No. 62/710,466, filed on Feb. 16, 2018.

(51) Int. Cl.
*H04L 41/0823* (2022.01)
*H04W 24/08* (2009.01)
*H04W 56/00* (2009.01)

(52) U.S. Cl.
CPC ......... *H04L 41/0813* (2013.01); *H04W 24/08* (2013.01); *H04W 56/001* (2013.01)

(56) References Cited

U.S. PATENT DOCUMENTS

| 2018/0027424 A1 | 1/2018 | Chen |
| 2018/0034525 A1 | 2/2018 | Park |

FOREIGN PATENT DOCUMENTS

| GB | 2507570 A | 12/2012 |
| RU | 2623736 C2 | 6/2017 |
| WO | 2014068535 A2 | 5/2014 |
| WO | 2017197264 A1 | 11/2017 |
| WO | 2018027886 W | 2/2018 |

OTHER PUBLICATIONS

3GPP TS 36.321 V15.0.0 (Dec. 2017) 3rd Generation Partnership Project; Technical Specification Group Radio Access Network; Evolved Universal Terrestrial Radio Access (E-Utra); Medium Access Control (MAC) protocol specification.

3GPP, "3rd Generation Partnership Project; Technical Specification Group Radio Access Network; Evolved Universal Terrestrial Radio Access (E-Utra); Medium Access Control (MAC) protocol specification (Release 15)", TS 36.321 V15.0.0, Dec. 2017.

Ericsson, "Remaining details for radio link monitoring," R1-1802948, 3GPP TSG RAN WG1 Meeting #92, Athens, Greece, Feb. 26-Mar. 2, 2018.

Ericsson, "RRC Configuration and Re-configuration of RLM parameters (E396)," R2-1802778, 3GPP TS-RAN WG2 AH-1801, Vancouver, Canada, Jan. 22-26, 2018.

Ericsson, Remaining details on radio link monitoring, 3GPP TSG RAN WGI Meeting AH 1801, R1-1800900, Vancouver, Canada, Jan. 22-26, 2018.

Intel Corporation, "Summary of Tuesday offline discussion for NR Radio Link Monitoring," R1-1721375, 3GPP TSG RAN WG1 Meeting #91, Reno, Nevada, USA, Nov. 27-Dec. 1, 2017.

Samsung, "Use of CSI RS based measurements in connected", 3GPP TSG-RAN WG2 Meeting #97-bis, Tdoc R2-1703257, Spokane, US, Apr. 3-7, 2017.

\* cited by examiner

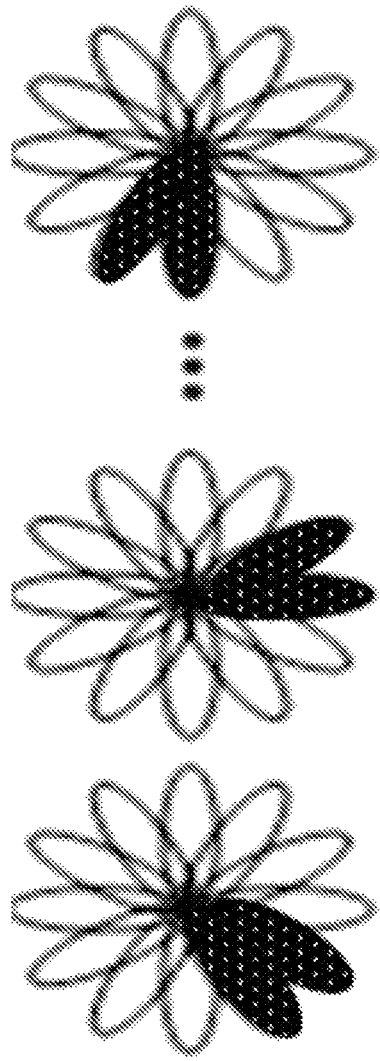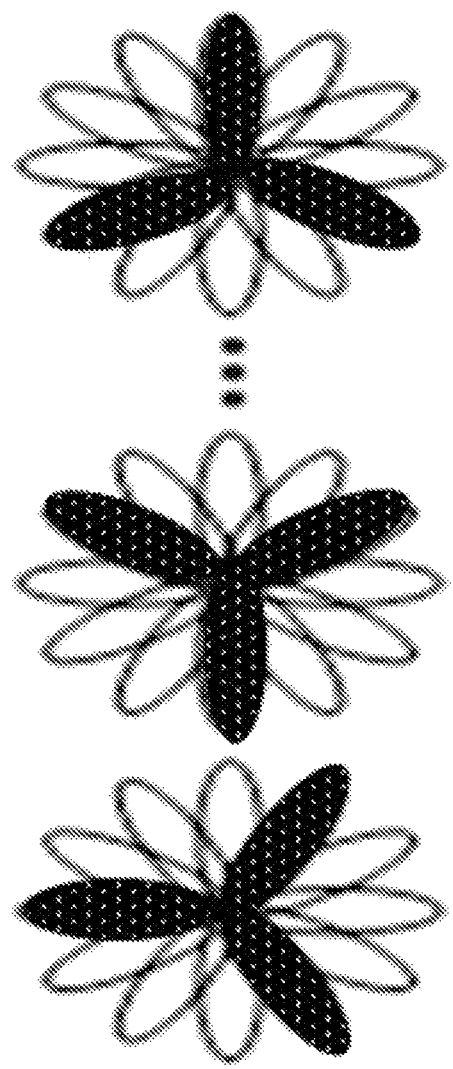

OPTIMIZED RECONFIGURATION OF RLM AND BEAM MONITORING PARAMETERS

PRIORITY CLAIMS

This application is a continuation of U.S. patent application Ser. No. 16/970,624 filed Aug. 17, 2020, which is a 371 of International Application No. PCT/IB2019/051200, filed Feb. 14, 2019, which claims the benefit of U.S. Provisional Application No. 62/710,466, filed Feb. 16, 2018, the disclosures of which are fully incorporated herein by reference.

BACKGROUND

The purpose of the RLM function in the UE is to monitor the downlink radio link quality of the serving cell in RRC_CONNECTED state and is based on the Cell-Specific Reference Signals (CRS), which is always associated to a given LTE cell and derived from the Physical Cell Identifier (PCI). This, in turn, enables the UE when in RRC_CONNECTED state to determine whether it is in-sync or out-of-sync with respect to its serving cell.

The UE's estimate of the downlink radio link quality is compared with out-of-sync (OOS) and in-sync (IS) thresholds, which may be referred to as Qout and Qin, respectively, for the purpose of RLM. These thresholds are expressed in terms of the Block Error Rate (BLER) of a hypothetical Physical Downlink Control Channel (PDCCH) transmission from the serving cell. Specifically, Qout corresponds to a 10% BLER while Qin corresponds to a 2% BLER. The same threshold levels are applicable with and without DRX.

The mapping between the CRS based downlink quality and the hypothetical PDCCH BLER is up to the UE implementation. However, the performance is verified by conformance tests defined for various environments. Also, the downlink quality is calculated based on the RSRP of CRS over the whole band since UE does not necessarily know where PDCCH is going to be scheduled, which is illustrated in FIG. 1, which illustrates that PDCCH can be scheduled anywhere over the whole downlink transmission bandwidth.

When no DRX is configured, OOS occurs when the downlink radio link quality estimated over the last 200 ms period becomes worse than the threshold Qout. Similarly, without DRX the IS occurs when the downlink radio link quality estimated over the last 100 ms period becomes better than the threshold Qin. Upon detection of out-of-sync, the UE initiates the evaluation of in-sync.

The key question in the RLF functionality is how the higher layers use the internally generated IS/OOS events from RLM to control the UE autonomous actions when it detects that is cannot be reached by the network while in RRC_CONNECTED.

In LTE, the occurrences of OOS and IS events are reported internally by the UE's physical layer to its higher layers, which in turn may apply RRC/layer 3 (i.e. higher layer) filtering for the evaluation of Radio Link Failure (RLF). FIG. 2 illustrates higher layer RLM procedures in LTE.

The details UE actions related to RLF are captured in the RRC specifications (38.331).

For NR, frequency ranges up to 100 GHz are considered. High-frequency radio communication above 6 GHz suffers from significant path loss and penetration loss. Therefore massive MIMO schemes for NR are considered.

With massive MIMO, three approaches to beamforming have been discussed: analog, digital, and hybrid (a combination of the two). FIG. 3 illustrates an example diagram for hybrid beamforming. Beamforming can be on transmission beams and/or reception beams, network side or UE side.

The analog beam of a subarray can be steered toward a single direction on each OFDM symbol, and hence the number of subarrays determines the number of beam directions and the corresponding coverage on each OFDM symbol. However, the number of beams to cover the whole serving area is typically larger than the number of subarrays, especially when the individual beam-width is narrow. Therefore, to cover the whole serving area, multiple transmissions with narrow beams differently steered in time domain are also likely to be needed. The provision of multiple narrow coverage beams for this purpose has been called "beam sweeping". For analog and hybrid beamforming, the beam sweeping seems to be essential to provide the basic coverage in NR. For this purpose, multiple OFDM symbols, in which differently steered beams can be transmitted through subarrays, can be assigned and periodically transmitted.

FIG. 4A illustrates TX beam sweeping on 2 subarrays.
FIG. 4B illustrates TX beam sweeping on 3 subarrays.
SS block and SS burst configuration are now described. The signals comprised in SS block may be used for measurements on NR carrier, including intra-frequency, inter-frequency and inter-RAT (i.e., NR measurements from another RAT).

SSB, NR-PSS, NR-SSS and/or NR-PBCH can be transmitted within an SS block, which can also be referred to as SS/PBCH block. For a given frequency band, an SS block corresponds to N OFDM symbols based on one subcarrier spacing (e.g., default or configured), and N is a constant. UE shall be able to identify at least OFDM symbol index, slot index in a radio frame and radio frame number from an SS block. A single set of possible SS block time locations (e.g., with respect to radio frame or with respect to SS burst set) is specified per frequency band. At least for multi-beams case, at least the time index of SS-block is indicated to the UE. The position(s) of actual transmitted SS-blocks can be informed for helping CONNECTED/IDLE mode measurement, for helping CONNECTED mode UE to receive DL data/control in unused SS-blocks and potentially for helping IDLE mode UE to receive DL data/control in unused SS-blocks. The maximum number of SS-blocks within SS burst set, L, for different frequency ranges are:

For frequency range up to 3 GHz, L is 4
For frequency range from 3 GHz to 6 GHz, L is 8
For frequency range from 6 GHz to 52.6 GHz, L is 64

By contrast, one or multiple SS burst(s) further compose an SS burst set (or series) where the number of SS bursts within a SS burst set is finite. From physical layer specification perspective, at least one periodicity of SS burst set is supported. From UE perspective, SS burst set transmission is periodic. At least for initial cell selection, UE may assume a default periodicity of SS burst set transmission for a given carrier frequency (e.g., one of 5 ms, 10 ms, 20 ms, 40 ms, 80 ms, or 160 ms). UE may assume that a given SS block is repeated with a SS burst set periodicity. By default, the UE may neither assume the gNB transmits the same number of physical beam(s), nor the same physical beam(s) across different SS-blocks within an SS burst set. In a special case, an SS burst set may comprise one SS burst.

For each carrier, the SS blocks may be time-aligned or overlap fully or at least in part, or the beginning of the SS blocks may be time-aligned (e.g., when the actual number of transmitted SS blocks is different in different cells). FIG. 5 illustrates an example configuration of SS blocks, SS bursts, and SS burst sets/series.

All SS blocks within a burst set are within 5 ms window, but the number of SS blocks within such window depends on the numerology (e.g., up to 64 SS blocks with 240 kHz subcarrier spacing). FIG. 6 illustrates an example mapping for SS blocks within a time slot and within the 5 ms window.

With regard to CSI-RS activation by MAC CE in LTE, the CSI-RS activation/deactivation by MAC CE command is specified in TS36.321 where Section 5.19 describes:

The network may activate and deactivate the configured CSI-RS resources of a serving cell by sending the Activation/Deactivation of CSI-RS resources MAC control element described in subclause 6.1.3.14. The configured CSI-RS resources are initially deactivated upon configuration and after a handover.

Section 6.1.3.14 discloses:

The Activation/Deactivation of CSI-RS resources MAC control element is identified by a MAC PDU subheader with LCID as specified in table 6.2.1-1. It has variable size as the number of configured CSI process (N) and is defined in FIG. 6.1.3.14-1. Activation/Deactivation CSI-RS command is defined in FIG. 6.1.3.14-2 and activates or deactivates CSI-RS resources for a CSI process. Activation/Deactivation of CSI-RS resources MAC control element applies to the serving cell on which the UE receives the Activation/Deactivation of CSI-RS resources MAC control element.

The Activation/Deactivation of CSI-RS resources MAC control elements is defined as follows:

$R_i$: this field indicates the activation/deactivation status of the CSI-RS resources associated with CSI-RS-ConfigNZPId i for the CSI-RS process. The $R_i$ field is set to "1" to indicate that CSI-RS resource associated with CSI-RS-ConfigNZPId i for the CSI-RS process shall be activated. The $R_i$ field is set to "0" to indicate that the CSI-RS-ConfigNZPId i shall be deactivated;

FIG. 7 illustrates activation/deactivation of CSI-RS resources by MAC Control element.

FIG. 8 illustrates activation/deactivation of CSI-RS resources by CSI-RS command.

The MAC activation was introduced in LTE to be able to configure more CSI-RS resources for a UE that the UE is able to support feedback for as the MAC CE would selective activate up to max CSI-RS resources supported. Then, without the need to reconfigure by RRC, network may activate another set among the resources configured for the UE.

With regard to MAC CE usage in NR, the MAC CEs agreed for NR are listed.

| RAN1 specification | Section | MAC CE message | Description | Value range |
|---|---|---|---|---|
| TS38.214 | 5.2.2.3.4 | Semi-persistent CSI-RS/CSI-IM | Activates/deactivates a SP CSI-RS resource set and a SP CSI-IM resource set. Provides the QCL relationship (if activated) | SP CSI-RS Resource Set Id (the size of ID <= 4 bits) \| SP CSI-IM Resource Set Id (the size of ID <= 4 bits) \| TCI_State_Id (the size of ID <= 6 bits) Each activated resource set can have up to 64 CSI-RS resources therefore Total bits <= 4 + 4 + 64*6 |
| TS38.214 | 5.2.1.5 | Aperiodic CSI trigger state subselection | Maps the Sc RRC configured aperiodic trigger states to $2^N-1$ codepoints in CSI request field (N = Bitwidth of CSI request field in DCI) | Bitmap of size Sc <= 128 (Maximum number of 1s in the bitmap is up to 63.) Sc is variable |
| TS38.214 | 5.1.5 | Activation of TCI (Transmission Configuration Indication) state(s) for UE-specific PDSCH | Activates/deactivates up to $2^N$ TCI states from a list of M TCI state. Each state of M TCI states is RRC configured with a downlink RS set used as a QCL reference, and MAC-CE is used to select up to $2^N$ TCI states out of M for PDSCH QCL indication. | Bitmap of size M <= 64, N = 3 |
| TS38.214 | 5.1.5 | Indication of TCI state for UE specific NR-PDCCH per CORESET | Out of the K TCI states configured per CORESET, the MAC-CE selects one out of K. | Bitmap to select one out of K states K <= M (M_max = 64, K_max = M_max) |

-continued

| RAN1 specification | Section | MAC CE message | Description | Value range |
|---|---|---|---|---|
| TS38.214 | 5.2.4 | Semi-persistent CSI reporting (on PUCCH) activation | Activates a SP CSI Report | Bitmap with length of the number of SP CSI reporting settings The length of bitmap <= [$CSI_{SP}$ = 8] bits |
| TS38.214 | 6.2.1 | Semi-persistent SRS activation | Activates a SP SRS resource set and provides the spatial relationship (if activated) | SP SRS Resource Set Id (the size of ID <= [$SRS_1$ = 4]bits) \| SSB ID (the size of ID <= 6 bits)/ SRS resource ID (the size of ID <= [$SRS_2$ = 5]bits)/ CSI-RS resource ID (the size of ID <= 7 bits) Each activated resource set can have up to $S_2$ SRS resources therefore Total bits <= $SRS_1$ + $SRS_2$*7 |

| Specification Number | Parameter Name | Description | Size/format |
|---|---|---|---|
| TS38.214 | PUCCH-SpatialRelationInfo | Provides the spatial relation for a PUCCH resource | PUCCH resource ID (the size of ID <= [$N_{CCH}$ = 4]bits) \| Bitmap of size (the length of bitmap <= [$QCL_{UL}$ = 8] bits) (Bitmap activates one of the [$QCL_{UL}$ = 8] entries within the RRC parameter PUCCH-Spatial-relation-info) |

With regard to RLM handing in NR, two types of reference signals (RS Types) are defined for L3 mobility: PBCH/SS Block (SSB or SS Block), which basically comprises synchronization signals equivalent to PSS/SSS in LTE and PBCH/DMRS, and, CSI-RS for L3 mobility, more configurable and configured via dedicated signalling. There are different reasons to define the two RS types, one of them being the possibility to transmit SSBs in wide beams while CSI-RSs in narrow beams.

In RAN1 #NR AdHoc #2, it has been agreed that in NR the RS type used for RLM is also configurable (both CSI-RS based RLM and SS block based RLM are supported) and, it seems natural that the RS type for RLM should be configured via RRC signalling. In RAN1 #90, further progress was reached and it was agreed to support single RLM-RS type only to different RLM-RS resources for a UE at a time.

As NR can operate in quite high frequencies (above 6 GHz, but up to 100 GHz), these RS types used for RLM can be beamformed. In other words, depending on deployment or operating frequency, the UE can be configured to monitor beamformed reference signals regardless which RS type is selected for RLM. Hence, differently from LTE, RS for RLM can be transmitted in multiple beams.

In the case of CSI-RS, the time/frequency resource and sequence can be used. As there can be multiple beams, the UE needs to know which ones to monitor for RLM and how to generate IS/OOS events. In the case of SSB, each beam can be identified by an SSB index (derived from a time index in PBCH and/or a PBCH/DMRS scrambling). In RAN1 #90, it has been agreed that this is configurable and, in NR the network can configure by RRC signalling, X RLM resources, either related to SS blocks or CSI-RS, as follows:
  One RLM-RS resource can be either one PBCHSS block or one CSI-RS resource/port;
  The RLM-RS resources are UE-specifically configured at least in case of CSI-RS based RLM;
  When UE is configured to perform RLM on one or multiple RLM-RS resource(s),
    Periodic IS indicated if the estimated link quality corresponding to hypothetical PDCCH BLER based on at least Y RLM-RS resource(s) among all configured X RLM-RS resource(s) is above Q_in threshold;
    Periodic OOS is indicated if the estimated link quality corresponding to hypothetical PDCCH BLER based on all configured X RLM-RS resource(s) is below Q_out threshold;
      That points in the direction that only the quality of best beam really matters at every sample to generate OOS/IS events.

In RAN2 #94 in Nanjing, the first meeting we have discussed NR mobility, the following has been agreed:
  Two levels of network controlled mobility:
    1: RRC driven at 'cell' level
    2: Zero/Minimum RRC involvement (e.g., at MAC/PHY FFS what is the definition of a cell)
Since then, it has always been assumed at least in RAN2 that inter-cell mobility relies on RRC level, while intra-cell mobility (which includes beam management procedures within the same cell) should not have RRC involvement. However, in RAN1 #90 the following has been agreed:
  NR supports to configure X RLM-RS resource(s)
    One RLM-RS resource can be either one SS/PBCH block or one CSI-RS resource/port The RLM-RS resources are UE-specifically configured at least in case of CSI-RS based RLM Then, in RAN1 #90bis, it has been greed that the value of X should be limited, as follows:

NR supports configuration of at most X number of RLM-RS (CSI-RS and/or SSB) resources for a UE final value of X to be determined in the next meeting and (X<=[8])

Note: in the deployment scenario where BM is needed, the BM processing and reporting are a pre-requisite for the network to select up to X RLM-RSs.

FFS: whether to have different number for sub 6 and above 6 GHz

Then in RAN1 #91, it has been agreed that the value of X for the maximum number of resources could vary for different frequency ranges, as follows:

For value of X:
For below 3 GHz: X=2
For above 3 GHz and below 6 GHz: X=4
For above 6 GHz: X=[8]
RLM-SSB: value range is 0, 1, . . . , 63
RLM-CSI-RS-timeConfig:
Periodicity, P: {5 ms, 10 ms, 20 ms, 40 ms}
Slot offset: {0, . . . , Ps-1} slots
Where Ps is number of slots within period P in the CSI-RS numerology
RLM-CSI-RS-FreqBand
Adopt the parameter values agreed in BM with following exception:
Minimum number of PRB is 24.

There currently exist certain challenge(s). To help understand them, the consequences of these agreements must be considered. It has also been agreed in RAN1 that the number of SSBs covering a cell can also vary per frequency range, and the following values have been agreed in RAN1 #88bis:

The considered maximum number of SS-blocks, L, within SS burst set for different frequency ranges are
For frequency range up to 3 GHz, the maximum number of SS-blocks, L, within SS burst set is [1, 2, 4]
For frequency range from 3 GHz to 6 GHz, the maximum number of SS-blocks, L, within SS burst set is [4, 8]
For frequency range from 6 GHz to 52.6 GHz, the maximum number of SS-blocks, L, within SS burst set is [64]

Then, especially for SSB-based RLM, if we compare the values of L (maximum number of transmitted SSBs for cells in a given frequency range) and X (maximum number of RLM-RS resources for a given frequency range), we will have scenarios where X is lower than L, as shown below:

|  | f < 3 GHz | 3 GH < f < 6 GHz | f > 6 GHz |
| --- | --- | --- | --- |
| Max value for X | 2 | 4 | 8 |
| Max value for L | 4 | 8 | 64 |

As it can be seen from the table above, the number of beams (the term 'beams' may be used instead of RLM-RS resources) that can be configured for RLM is smaller than the number of beams possibly providing cell coverage. FIG. 9 illustrates this scenario for frequencies between 3 GHZ and 6 GHZ where L=8 and X=4 (i.e. for frequencies between 3 GHz and 6 GHz). Then, if the UE moves within the coverage of that cell, the beams to be used for RLM may need to be re-configured, otherwise the UE would possibly start generating OSS events (and possibly declare RLF) even though the UE is still under cell coverage.

When that situation happens, what the network would likely want to be able to do is to reconfigure both the beams serving the UE with PDCCH and, consequently, the beams to be monitored for RLM (as these should be correlated). FIG. 10 illustrates the network re-configuring the PDCCH beams and consequently the RS-RLM resources/beams.

However, certain problems with the baseline solution exist. For example, RRC signaling is usually considered for re-configurations in mobile networks, and hence, it could be assumed every time the UE needs to re-configure RLM-RS parameters such as the as a baseline solution. However, a consequence of the RAN1 decision to have X<L is that, if only RLM-RS re-configuration mechanisms allowed is the one based on RRC, UE would likely require RRC signalling to perform intra-cell mobility, which goes against the very first NR mobility agreement in RAN2. Thus, an observation is that current RAN1 assumptions on the maximum RLM-RS resources (equals to 8) requires intra-cell RRC based mobility, which is against RAN2 early agreement.

SUMMARY

Certain aspects of the present disclosure and their embodiments may provide solutions to these or other challenges. For example, a method is disclosed that includes a configuration and re-configuration framework for RLM parameters such as, for example, RLM-RS resources. The method includes the UE being configured with a set of RLM configurations via RRC signaling send by the network and these configurations being possibly updated for example, by activation/deactivation, via lower layer signalling such as, for example, using MAC CEs, DCIS, or other signalling.

According to certain embodiments, a method by a wireless device is provided for optimized reconfiguration of radio link monitoring (RLM) and beam monitoring. The method includes receiving, from a first network node, a first message comprising at least one RLM parameter. A second message indicating activation of the at least one RLM parameter associated with the first message is received. The second message is a lower layer signal compared to the first message.

According to certain embodiments, a wireless device for optimized reconfiguration of RLM and beam monitoring is provided. The wireless device includes memory storing instructions and processing circuitry operable to execute the instructions to cause the wireless device to receive, from a first network node, a first message comprising at least one RLM parameter and a second message indicating activation of the at least one RLM parameter associated with the first message is received. The second message is a lower layer signal compared to the first message.

According to certain embodiments, a network node is provided for optimized reconfiguration of RLM and beam monitoring. The method includes sending, to a wireless device, a first message comprising at least one RLM parameter and sending, to the wireless device, a second message indicating activation of at least one RLM parameter associated with the first message. The second message is a lower layer signal compared to the first message.

According to certain embodiments, a network node for optimized reconfiguration of RLM and beam monitoring is provided. The network node includes memory storing instructions and processing circuitry operable to execute the instructions to cause the network node to send, to a wireless device, a first message comprising at least one RLM parameter and send, to the wireless device, a second message indicating activation of at least one RLM parameter associated with the first message. The second message is a lower layer signal compared to the first message.

Certain embodiments may provide one or more of the following technical advantage(s). For example, a technical advantage of certain embodiments may include avoiding or minimizing RRC signalling due to intra-cell mobility. In particular, these advantages may be experienced when the RLM parameters need to be updated due to intra-cell mobility.

BRIEF DESCRIPTION OF THE DRAWINGS

For a more complete understanding of the disclosed embodiments and their features and advantages, reference is now made to the following description, taken in conjunction with the accompanying drawings, in which:

FIG. 4A illustrates TX beam sweeping on 2 subarrays;

FIG. 4B illustrates TX beam sweeping on 3 subarrays;

DETAILED DESCRIPTION

Figure 1:
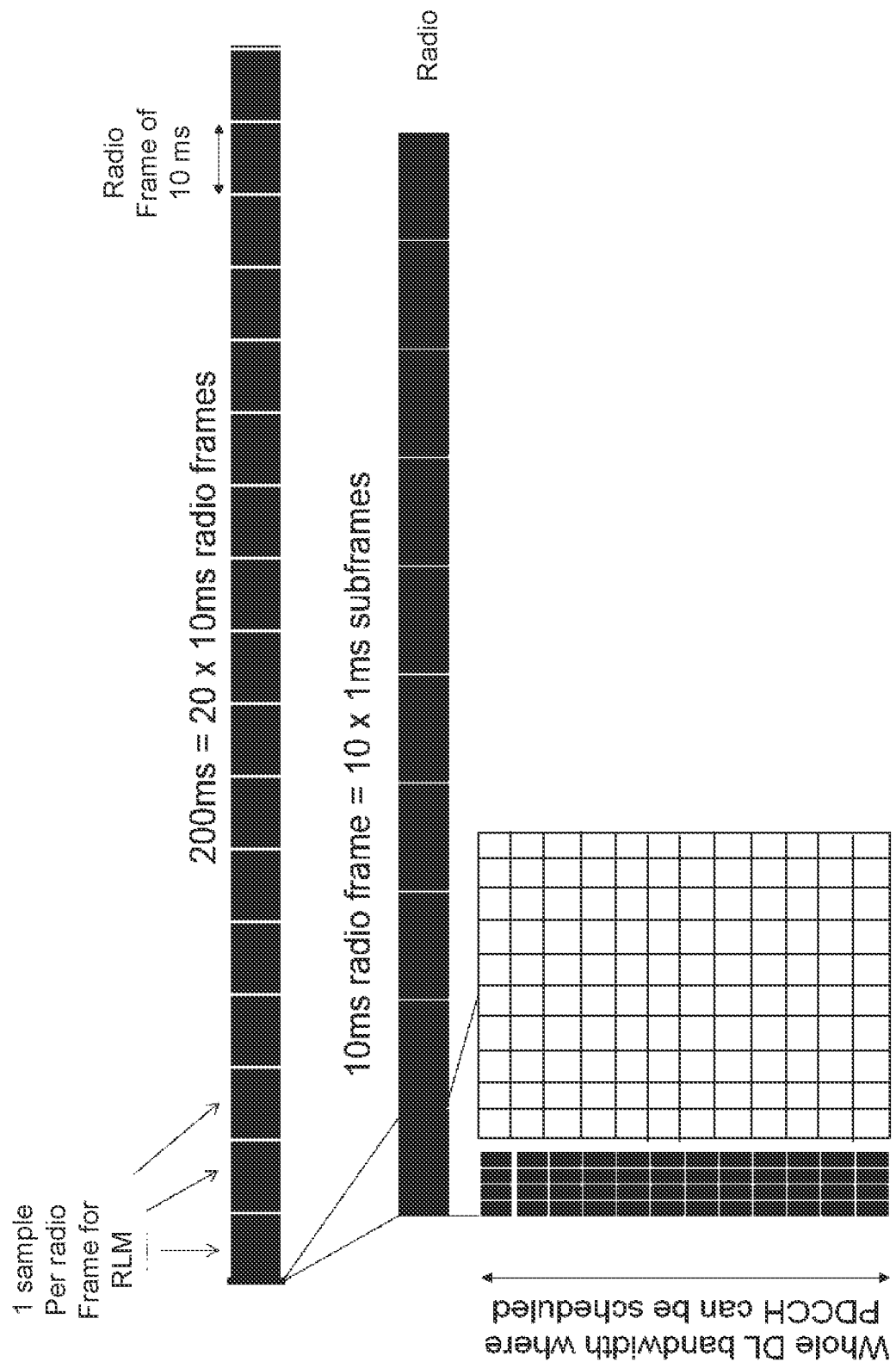
FIG. 1 illustrates that physical downlink control channel (PDCCH) may be scheduled anywhere over the whole downlink transmission bandwidth.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also in some embodiments generic terminology "network node", is used. It can be any kind of network node which may comprise of a radio network node such as base station, radio base station, base transceiver station, base station controller, network controller, multi-standard radio BS, gNB, en-gNB, ng-eNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., 3$^{rd}$ parry node, a node external to the current network), etc. The network node may also comprise a test equipment.

The term "BS" may comprise, e.g., gNB, en-gNB or ng-eNB or a relay node, or any BS compliant with the embodiments.

The term "radio node" used herein may be used to denote a UE or a radio network node.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term RLM procedure used herein may refer to any process occurs or action taken by the UE during the RLM. Examples of such processes or actions are OOS evaluation, IS evaluation, filtering of IS/OOS (e.g. start of counters), triggering of RLF, start or expiration of RLF timer etc.

The term RLM performance used herein may refer to any criteria or metric which characterizes the performance of the RLM performed by a radio node. Examples of RLM performance criteria are evaluation period over which the IS/OOS are detected, time period within which the UE transmitter is to be turned off upon expiration of RLF timer etc.

The term numerology here may comprise any one or a combination of: subcarrier spacing, number of subcarriers within a bandwidth, resource block size, symbol length, CP length, etc. In one specific non-limiting example, numerology comprises subcarrier spacing of 7.5 kHz, 15 kHz, 30 kHz, 60 kHz, 120 kHz, or 240 kHz. In another example, numerology is the CP length which may be used with subcarrier spacing 30 kHz or larger.

Figure 11:
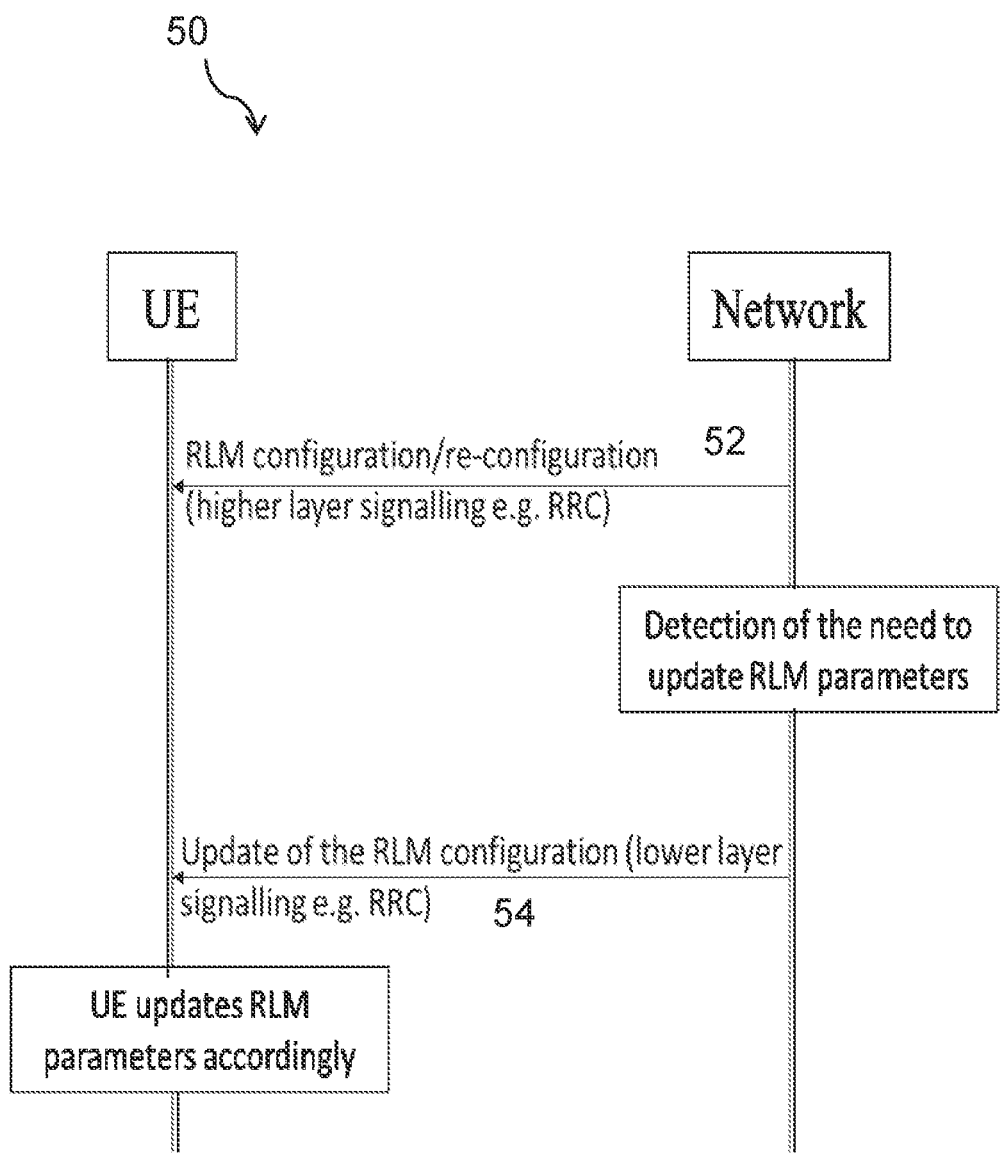
FIG. 11 an example method that includes the UE being configured with a set of RLM configurations via RRC signalling sent by the network, according to certain embodiments.

According to certain embodiments, a method is provided that includes a configuration and re-configuration framework for RLM parameters, which may include, as one example, RLM-RS resources. FIG. 11 illustrates an example method 50 that includes the UE being configured with a set of RLM configurations via RRC signalling sent by the network at step 52, according to certain embodiments. As depicted, the configurations are possibly updated such as, for example, by activation/deactivation, via lower layer signalling at step 54, which may include using MAC Ces, DCIS, or other signalling elements.

Additional details described below include:
the RLM configuration(s)/re-configuration(s) the UE may receive via higher layer signalling (e.g. RRC message);
the kind of higher layer messages (and associated scenarios) the UE may receive the RLM configuration/re-configurations;
the kind of updates the UE may perform based on the messages transmitted via lower layer signalling related to the previously provided configuration(s)/re-configuration(s) via higher layer signalling (RRC).

Other techniques have been proposed for NR changing a set of RLM-RS resources. For example, re-configurations of RLM parameters has been proposed elsewhere. However, the focus in those disclosures is not at all related to trying to make the re-configuration framework as efficient as possible. Rather, it was proposed that for the different kinds of re-configurations of RLM parameters there could be different UE actions that should be taken depending on the configuration. As disclosed herein, however, the focus is on making the re-configuration framework as efficient as possible to avoid/minimize the intra-cell RRC signalling.

As another example, there have previous disclosures relating to RLM re-configuration upon BWP switching. More specifically, a method has been proposed where the UE is configured by the network with one or multiple RLM configuration(s) or determines (e.g., based on a pre-defined rule) one or more RLM configuration parameters based on the active BWP or the set of active BWPs. One of them can be configured by the network or determined by the UE (e-g-. based on a pre-defined rule) as active RLM configuration. There may also be a default RLM reconfiguration, which is configured by the network, specified by the standard, or determined by the UE based on a pre-defined rule; the default RLM configuration may or may not be further associated with a default BWP. By contrast, in the techniques disclosed herein, each RLM configuration comprises at least one set of radio resources and configuration parameters for doing RLM within one bandwidth part (BWP).

Further, the change proposed in previous solutions is a change of RLM configurations when there is a change in BWP. Meanwhile, the techniques disclosed herein are applied in the case where the RLM parameters must be changed even if the UE is still within the same BWP such as, for example, when there is the need for an optimized RLM re-configuration framework even though the UE remains in the same BWP, e.g., due to intra-cell mobility.

With regard to the RLM configuration(s)/reconfiguration(s) the UE may receive via higher layer signaling, according to a first set of embodiments, the UE may receive from the network a mapping between one or multiple (e.g. N1) RLM configuration(s) and a set of indexes and applies that configuration. One such example mapping is shown in Table 1:

TABLE 1

| RLM configuration-1 | Index 1 |
|---|---|
| RLM configuration-2 | Index 2 |
| ... | |
| RLM configuration-N1 | Index N1 |

The higher layer message can also indicate to the UE (implicitly or explicitly) which configuration should be activated upon receiving the higher layer message. By doing the need for a follow up via a lower layer update message (e.g. MAC CE) may be avoided at least when the UE just receives the configuration from the higher layers such as, for example, when a handover occurs, when the UE is resuming or establishing a connection or when the network simply decides to re-configure RLM parameters with higher layer signalling.

The explicit indication could be a flag indicating a "default" configuration to be considered initially activated. The implicit indication for the default configuration could be simply a specific index in the set of configurations, such as the first index. UE uses that default the UE activates upon receiving the message and remains using until it receives a new configuration from higher layers to an update command from lower layers. If only one configuration is provided, that implicit indication means the UE only changes its RLM configuration via RRC signalling.

Each RLM configuration described in the table above can be related to different parameters of a combination of them.

According to certain embodiments, each RLM configuration in that table can be a set of RLM-RS resources. Thus, in a particular embodiment, each set of RLM-RS resources may have the same number of resources as there is a maximum number X of RLM-RS that can be monitored by the UE at time. Each RLM-RS configuration contains a set of X RLM-RS resources. In another embodiment, different RLM-RS configurations can have a different number of RLM-RS resources, which would increase the number of bits to encode the index that activates a given configuration via lower layer signalling but provides higher flexibility to the network.

For example, for frequencies <3 GHz, X can be up to 2 resources. As there can be up to L=4 SSBs (SSB1, SSB2, SSB3, SSB4), the following combinations for the X RLM-Rs resources, if we only consider RS type as SSB for the sake of this example are listed in Table 2:

TABLE 2

| RLM-RS resource(s) | Index |
|---|---|
| (SSB1, SSB2) | 0 |
| (SSB1, SSB3) | 1 |
| (SSB1, SSB4) | 2 |
| (SSB2, SSB3) | 3 |
| (SSB2, SSB4) | 4 |
| (SSB3, SSB4) | 5 |

Although that could be the configuration/re-configuration provided by the network to the UE, there could be smarter network decisions in terms of avoiding certain configuration that might be quite unlikely to be used. For example, if SSB1 and SSB4 are quite far apart in the spatial domain and are never detected by the UE simultaneously anyway, there might be no point to even consider that configuration as a possible one to be ever activated by lower layer signalling. Hence, it might be the case that network/re-configures configures only a subset of likely configurations. That smart network implementation can have the potential to reduce the number of bits necessary to encode the index in the lower layer signalling (e.g. MAC CE). In this example, only adjacent beams are considered likely configurations. An example is shown below in Table 3:

TABLE 3

| RLM-RS resource(s) | Index |
|---|---|
| (SSB1, SSB2) | 0 |
| (SSB2, SSB3) | 1 |
| (SSB3, SSB4) | 2 |

Notice that although the maximum number of RLM-RS resources for a given frequency range is limited, e.g., 2 in the case of frequencies below 3 GHz, the UE can still be configured with a lower number of RLM-RS resources. There could also be configurations mixing different number of resources single and double resources, as shown below in Table 4:

TABLE 4

| RLM-RS resource(s) | Index |
|---|---|
| (SSB1, SSB2) | 0 |
| (SSB1, SSB3) | 1 |
| (SSB1, SSB4) | 2 |
| (SSB2, SSB3) | 3 |
| (SSB2, SSB4) | 4 |
| (SSB3, SSB4) | 5 |

TABLE 4-continued

| RLM-RS resource(s) | Index |
|---|---|
| SSB1 | 6 |
| SSB2 | 7 |
| SSB3 | 8 |
| SSB4 | 9 |

The previous example have shown only SSB resources as RLM-RS resources. However, not all embodiments are limited to that. Exactly the same reasoning could be applied for other two possible cases:
  RLM-RS resources to be monitored are configured to be CSI-RS resources;
  RLM-RS resources to be monitored are configured to be a mix of SSBs and CSI-RS resources.

For the first case (only CSI-RS resources as RLM-RS(s)), the previous examples would be quite similar except that instead of SSB index one would use a CSI-RS index, that can be associated to a CSI-Rs configuration (BW, sequence, time domain resources, exact frequency resources, subcarrier spacing, etc.). Table 5 repeats the first example but with CSI-RS:

TABLE 5

| RLM-RS resource(s) | Index |
|---|---|
| (CSI-RS index 1, CSI-RS index 2) | 0 |
| (CSI-RS index 1, CSI-RS index 3) | 1 |
| (CSI-RS index 1, CSI-RS index 4) | 2 |
| (CSI-RS index 2, CSI-RS index 3) | 3 |
| (CSI-RS index 2, CSI-RS index 4) | 4 |
| (CSI-RS index 3, CSI-RS index 4) | 5 |

And, at least one example is shown in Table 6 with the combination of SSBs and CSI-RS resources, where a limited number of configurations is provided:

TABLE 6

| RLM-RS resource(s) | Index |
|---|---|
| (CSI-RS index 1, SSB2) | 0 |
| (CSI-RS index 1, SSB3) | 1 |
| (CSI-RS index 1, SSB4) | 2 |
| (CSI-RS index 2, SSB3) | 3 |
| (CSI-RS index 2, SSB4) | 4 |
| (CSI-RS index 3, SSB4) | 5 |

Notice that the number of bits to be transmitted in the configuration activation/deactivation message (to be sent by the network via lower layers) increases as the number of configurations increase. Hence, to further have a more efficient scheme, a solution could be to limit the parameters to be activated via lower layer signalling, while other parameter could be defined via higher layers only. In one example embodiment, RS type is only configured via RRC, while the exact resources can be configured via RRC and activated via lower layer signalling. In another example embodiment, the other way around could be defined: the exact resource indexes are defined via RRC and the activation of one RS type or the other (SSB or CSI-RS) is done via lower layer signalling.

Although we have provided examples for the case where X=2 and L=4, for frequencies <3 Hz, the method, examples and embodiments described above can be extended to the other cases too. The main difference would be the number of possibly or likely configurations and, possibly, the number of bits used to send the activation of a given configuration (i.e. the number of bits to encode the index of a particular configuration).

In other embodiments, the network simply informs the UE via the RRC signalling which SSBs are being transmitted by that cell. For example, although in higher layers (>6 Ghz) there can be up to 64 beams/SSBS, a network implementation might only be transmitting 16 and, the UE needs to be aware what are these 16 SSBs. In that sense, in this solution the UE can receive the exact 16 beams that are being transmitted, e.g., via a bitmap of 64 bits. One example is given:

First bitmap of SSBs transmitted: 1 1 1 1 1 1 1 1 1 1 1 1 1 1 1 1 0 0 0 0 . . . 0

The first 16 bits indicates to the UE that the first 16 SSBs are being transmitted by that cell. Hence, UE knows that for RLM based on SSB, only these 16 beams could be activated. Then, the UE could be configured (e.g. via RRC) with another bitmap to indicate which ones (up to 8, as this is >6 GHz) are to be monitored for RLM. For example, assume the network decides to configure and activate the first 8 bits.

In one example, only 8 bits are used for the bitmap, where the exact SSB to be monitored for RLM is associated with the previous bitmap. The following example is associated to the previous example:

Second bitmap of SSBs to be used for RLM: 1 1 1 1 1 1 0 0 0 0 0 0 0 0 0 1

That bitmap indicates the UE shall monitor for RLM the following: SSB1, SSB2, . . . , SSB7 and SSB16. That bitmap can either be provided via RRC or lower layer signalling, e.g., MAC CE. The first time the second bitmap is provided can be done via RRC, while lower layer signaling can be used to change the RLM-RS resources by providing a different bitmap.

Now a different example is provided, where network decides to transmit intercalated 16 SSBs, out of 64 beams. That means the network transmits the following bitmap to indicate that:

First bitmap of SSBs transmitted: 1 0 1 0 1 0 1 0 1 0 1 0 1 0 1 0 1 . . . 0

The UE interpret that as network transmitting SSB1, SSB3, SSB5, SSB7, . . . , SSB31. Hence, UE knows that for RLM based on SSB, only these 16 beams could be activated SSB1, SSB3, SSB5, SSB7, . . . , SSB31. Hence, UE could be configured (e.g. via RRC) with another bitmap to indicate which ones (up to 8, as this is >6 GHz) are to be monitored for RLM. For example, assume network decides to configure and activate the first 8 SSBs out of the ones being transmitted. Then, only 8 bits are used for the bitmap, where the exact SSB to be monitored for RLM is associated with the previous bitmap, i.e., the list SSB1, SSB3, SSB5, SSB7, . . . , SSB31. For example, the RLM bitmap can be the following:

Second bitmap of SSBs to be used for RLM: 1 1 1 1 1 1 0 0 0 0 0 0 0 0 0 1

That bitmap indicates the UE shall monitor for RLM the following: SSB1, SSB3, SSB5, SSB7, SSB9, SSB11, SSB13 and SSB31. That bitmap can either be provided via RRC or lower layer signalling, e.g., MAC CE. The first time the second bitmap is provided can be done via RRC, while lower layer signaling can be used to change the RLM-RS resources by providing a different bitmap.

In yet another embodiment, each RLM configuration in the set described in the first table can be associated to one of the following parameters or a combination of these:

RS type (which can be for example, SSB, CSI-RS or TRS);

BLER pair (one threshold value for generating OOS indications, another threshold value for generating IS indications);

Individual BLER for generating OOS indications

Individual BLER for generating IS indication

Combination of any of these, including RLM-RS resources combining different RS type resources;

In still another embodiment, a single RLM configuration is provided to the UE via RRC, to be the first one to be considered activated. Then, remaining re-configurations are handled by the lower layers, such as via MAC CEs.

With regard to the kind of higher layer messages (and associated scenarios) within which the UE may receive the RLM configuration/re-configurations, it is recognized that the RLM configuration(s) can be provided, for example, via one of the following RRC messages, according to certain embodiments:

RRCResume, transmitted by the network in response to an RRCResumeRequest, when the UE wants to resume a connection coming from inactive state to connected state;

RRCReconfiguration without synchronization, which is basically when the UE remains in the same serving cell and update a set of its parameters. In the case of RLM parameters, that could be transmitted when the UE enters the coverage of a different TRP of the same cell;

RRCReconfiguration with synchronization, which is basically a handover, i.e., inter-cell mobility.

With regard to the kind of updates the UE does based on the messages transmitted via lower layer signalling related to the previously provided configuration(s)/re-configuration(s) via higher layer signalling (RRC), it is recognized that one alteration of the first embodiments is that a lower layer signalling, such as a MAC CE, encodes an index associated to one of the RLM configurations provided via higher layer signalling, such as the ones provided in the table(s) described above. Upon receiving that lower layer signaling the UE deactivates the previously active configuration, if any, and activates the one indicated by that lower layer signalling.

For example, if the following table has been provided via higher layer signalling in Table 7:

TABLE 7

| RLM configuration-1 | Index 1 |
|---|---|
| RLM configuration-2 | Index 2 |
| . . . | |
| RLM configuration-N1 | Index N1 |

Each index can be transmitted via the MAC CE. In another embodiment, mainly applicable for the case where RLM-RS resources are the parameters to be updated, there can be a different mechanism based on lower layer signalling. For example, if the UE has a maximum number of RLM.RS resources, each MAC CEs can be used to indicate the UE that one of the following actions or a combination of them shall be performed:

remove a set of one or multiple RLM-RS resource(s) previously configured;

add a set of one or multiple RLM-RS resource(s);

delete or not delete RLM related measurements associated to a previous configuration.

In another embodiment, mainly applicable for the case where RLM-RS resources are the parameters to be updated, there can be a different mechanism based on the lower layer signaling provides a bitmap to the UE indicating which exact RLM-RS resources out the ones previously provided to the UE (e.g. via RRC signalling) shall be monitored for RLM.

In yet another embodiment, an update of lower layer signalling of the PDDCH configuration, in particular the DL directions that PDCCH is to be detected by the UE, also triggers the UE to change the RLM-RS resources to be monitored. For example, if an indication from lower layers indicates to the UE that PDCCH will stop being transmitted in beams correlated/quasi-collocated with a set of beams as SSB0, SSB1, . . . , SSB8 and will start to be transmitted in beams correlated/quasi-collocated with another set of beams SSB1, SSB2, . . . , SSB9, the UE update its RLM-RS configuration from SSB0, SSB1, . . . , SSB8 to SSB1, SSB2, . . . , SSB9.

In yet another example embodiment, a MAC CE updates the set of RLM resources such that when UE receives the MAC CE, it considers the resources pointed by the MAC CE to be the current set of RLM resources. In addition to pointing to RLM resources the MAC CE optionally gives QCL information for the RLM resource.

The serving cell of the UE has L SSBs out of which a subset may be configured for the UE to be considered as potential RLM resources. Additionally, a UE may be configured with M CSI-RS resources or CSI-RS resource sets each having an ID. Here, M has a specified maximum value. Also, SSBs have IDs which are represented by a maximum of 6 bits. The maximum number of bits required to represent the IDs for CSI-RS resources or CSI-RS resource sets can be up to 7. We denote the maximum number of bits required to represent the CSI-RS resource or CSI-RS resource set IDs by X.

Figure 8:
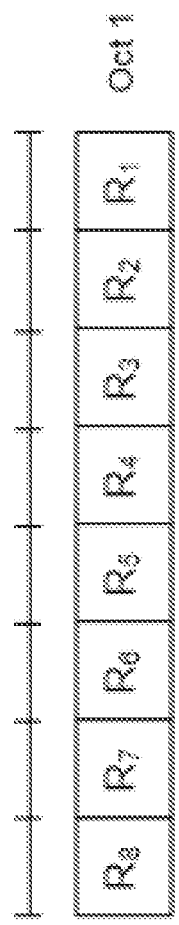
FIG. 8 illustrates activation/deactivation of CSI-RS resources by CSI-RS command.
Figure 9:
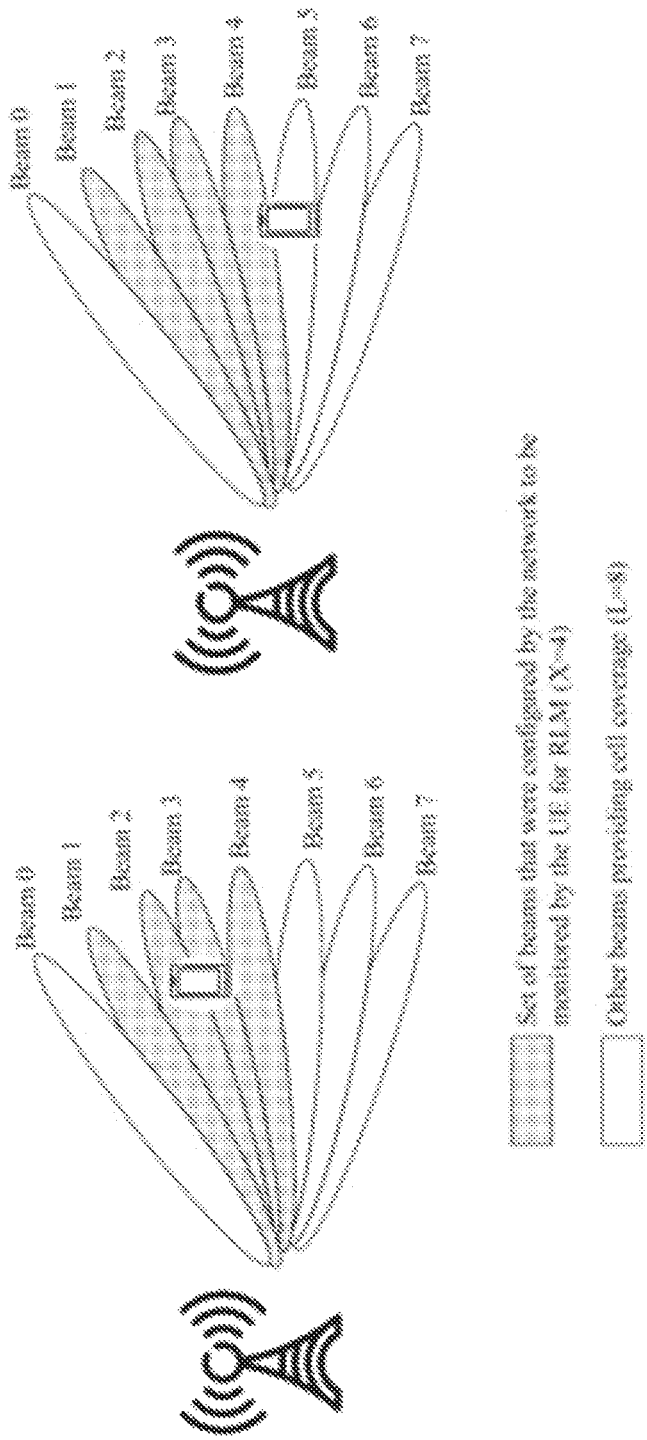
FIG. 9 illustrates the number of beams that can be configured for RLM is smaller than the number of beams possibly providing cell coverage.
Figure 10:
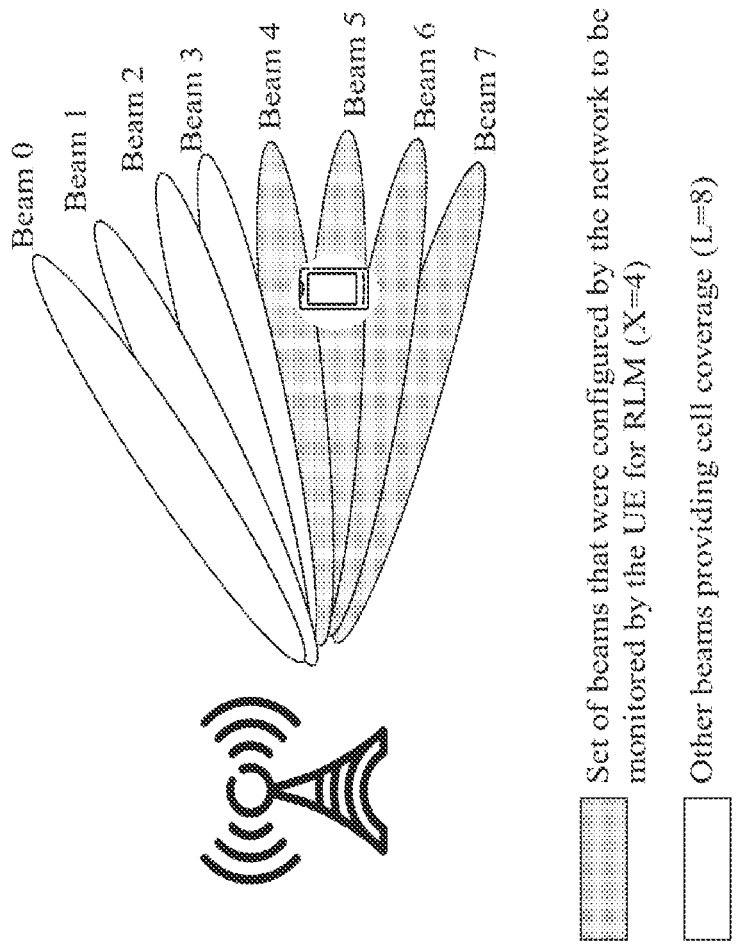
FIG. 10 illustrates the network re-configuring the PDCCH beams and consequently the RS-RLM resources/beams.

Though FIG. 8 only shows the one octet, the MAC CE may contain as many of the below described octets as there are RLM resources in the activated set of RLM resources. In addition, according to certain embodiments, the MAC CE contains octets to describe the MAC CE type, give possibly cell and BWP index, and have a bit that describes if QCL info is present or not. Further in addition, the MAC CE may optionally contain QCL information in additional octets for each RLM resource by giving the QCL reference RS, SSB or CSI-RS index in an octet, in a particular embodiment.

Each of the octets giving RS index for RLM resource or the QCL info for that are formed such that bit R8 tells if the index is for SSB, R8 is set to 1, or for CSI-RS R8 is set to 0. The rest of the bits, R7 to R1 are used to give the index of the RLM resource, or QCL info reference resource. If less than 7 bits are needed then rest are padding bits ignored by MAC entity.

Which octet describes RLM resource and which QCL is predetermined. For example, if it is indicated that QCL info is present, then each RLM resource octet that gives CSI-RS resource is followed by an octet that gives QCL info. Or, after all RLM resources are given, the following octets give QCL info for each CSI-RS resource that was present in the order those where present.

When the UE receives the MAC CE that indicates a set of resources, the UE may compare that set to previous set. For those resources that existed also in the previous RLM RS set, UE continues the monitoring and the evaluations for IS/OOS. For new resources, UE starts the monitoring and evaluation for IS/OOS. For resources that are no longer in the set, UE stops monitoring and discards evaluations for IS/OOS.

The problem could be solved by network implementation in different manners. For example, according to certain embodiments, a first alternative to the problem could be that the number of RLM-RS resources is aligned with the maximum number of RLM-RS resources and the maximum number of SSBs (i.e. align L and X).

In other embodiments, there could be yet other solutions such as never configuring SSB as RLM-RS and always rely on a set of UE-specific CSI-RS resources that are not re-configured towards the UE but could be beamformed in different directions by the network tracking/following the UE. That might work in scenarios with very few UEs, where UE-specific CSI-RS resources can be configured. On the other hand, this solution may be quite complex or unfeasible in the case the network wants to configure a set of CSI-RS resources periodically transmitted in the cell and shared across multiple UEs (although configuration is still provided in dedicated signaling). Notice that this solution can be used in combination with any of the previous embodiments to reduce the number of configuration and, consequently, the number of bits indicated via lower layer signalling. By possibly tracking the UE with CSI-RS, the network can configure a limited amount of CSI-RS resource sets, as in many cases tracking cam be used and there is no need to re-configure the UE with the activation mechanism via lower layer signalling.

According to still other embodiments, the problem may be addressed by limiting what can be deployed in terms of number of SSBs to what can be configured in terms of RLM RS resources. A manufacturer would never implement/deploy a network like that, and in practice would use L=X.

According to still other embodiments, another network related aspect may be that the operations executed by higher layers and lower layers could be executed by different nodes. In NR, a RAN architecture based on CU (central unit), possibly executing RRC functions and DU (distributed unit), possibly executing MAC functions. Hence, one aspect is that the DU and CU exchange these configurations/re-configurations and activation information that is provided to the UE so that both are up to date on the UE current configuration and activated RLM parameters.

Figure 12:
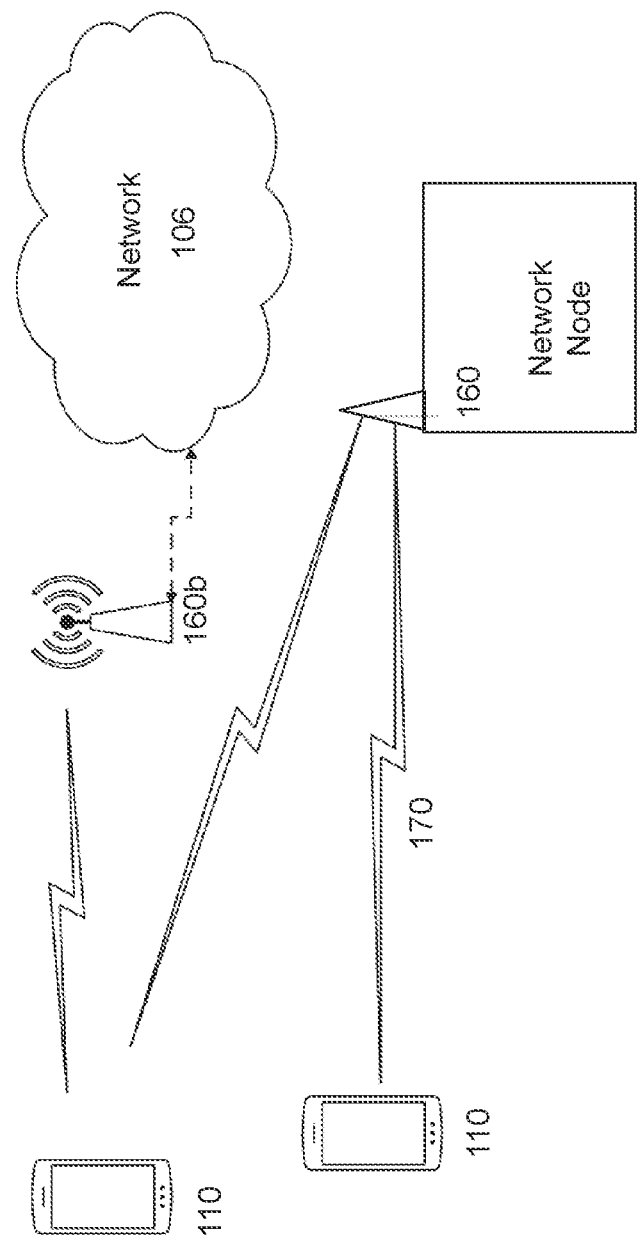
FIG. 12 illustrates an exemplary network for optimized reconfiguration of RLM and beam monitoring, according to certain embodiments.

FIG. 12 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 13:
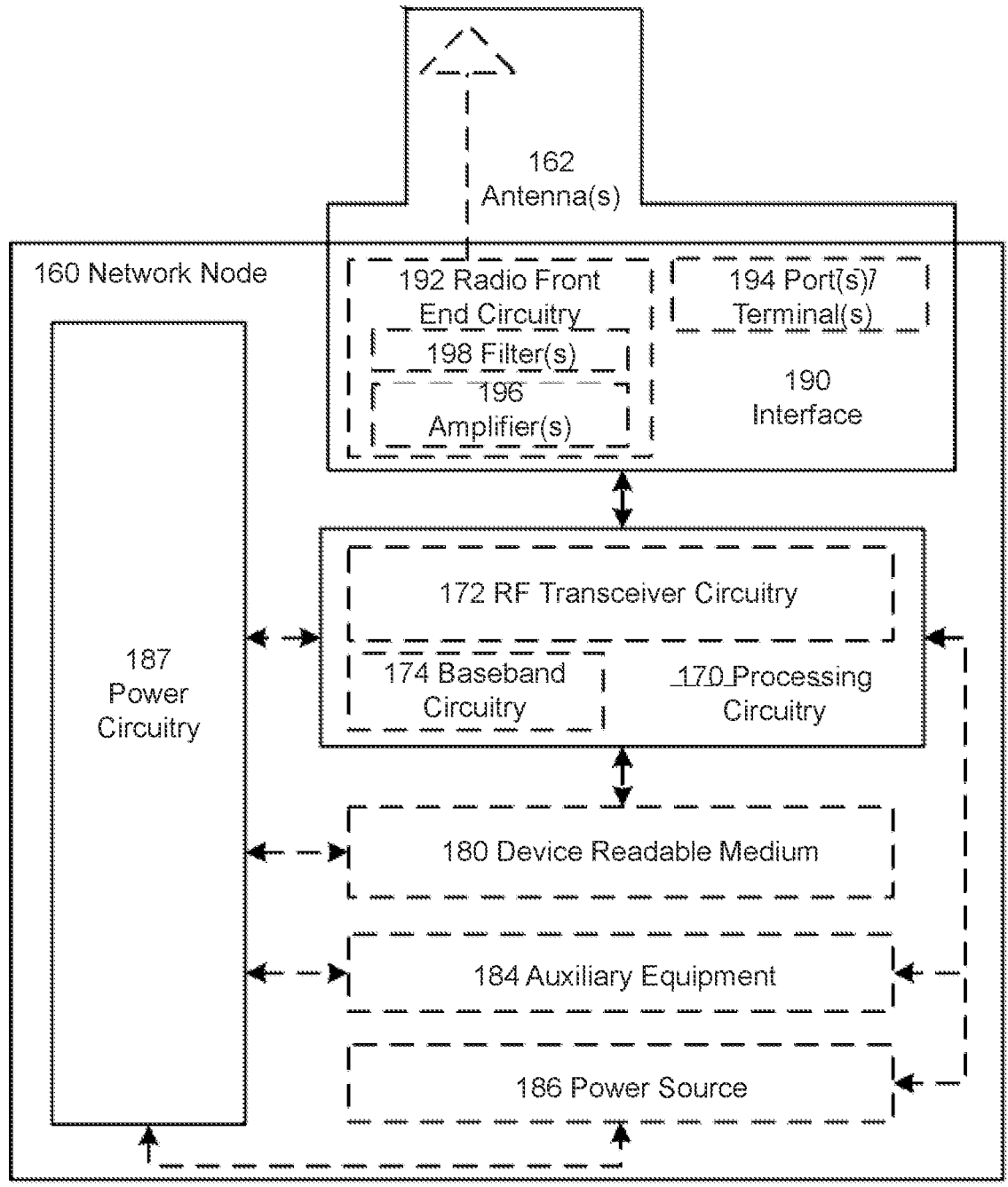
FIG. 13 illustrate an example network node for optimized reconfiguration of RLM and beam monitoring, according to certain embodiments.

FIG. 13 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 160 includes processing circuitry 170, device readable medium 180, interface 190, auxiliary equipment 184, power source 186, power circuitry 187, and antenna 162. Although network node 160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 14:
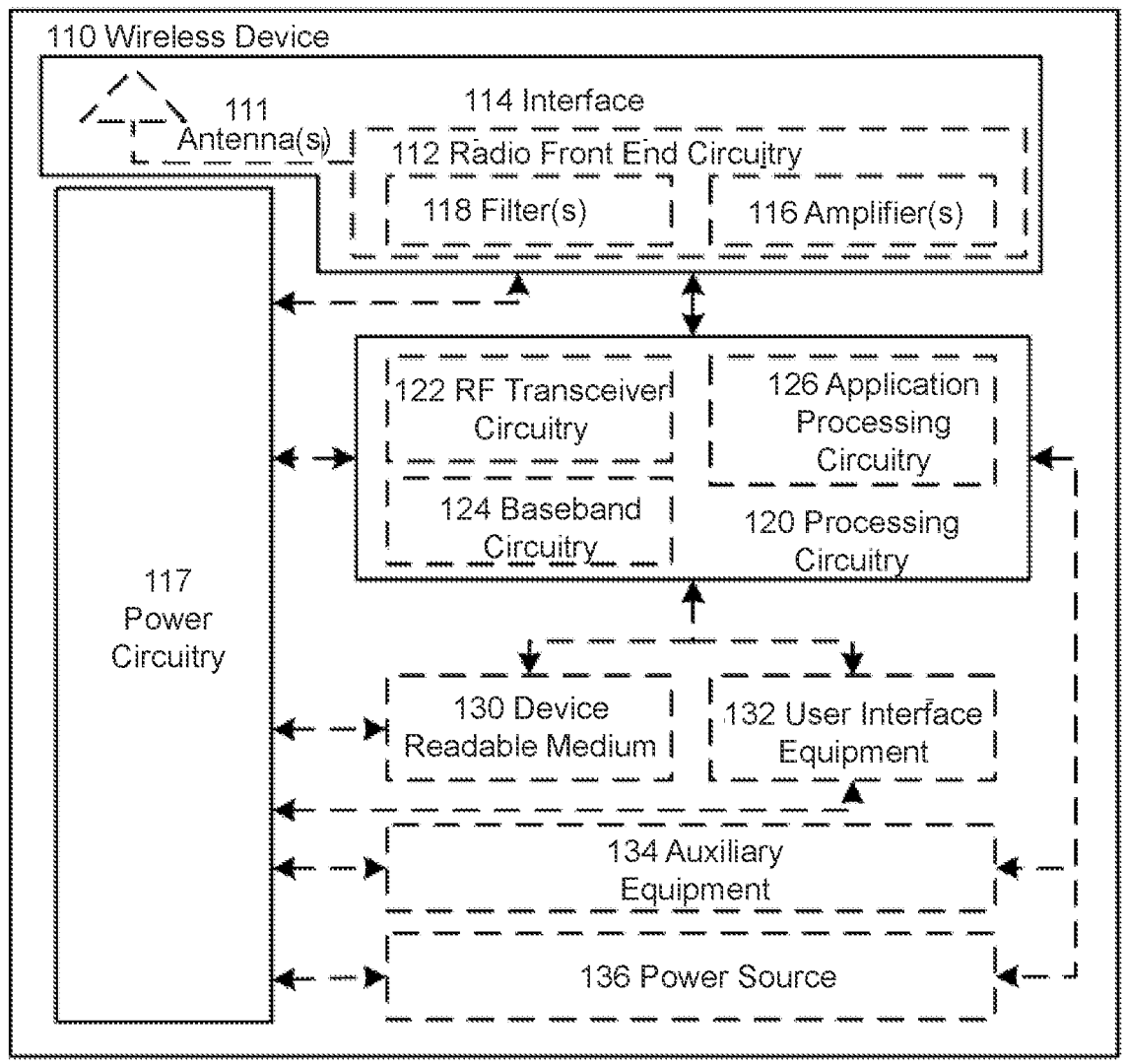
FIG. 14 illustrates an example wireless device for optimized reconfiguration of RLM and beam monitoring, according to certain embodiments.

FIG. 14 illustrates an example wireless device (WD) 110, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 14, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated in FIG. 14, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated in FIG. 14, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
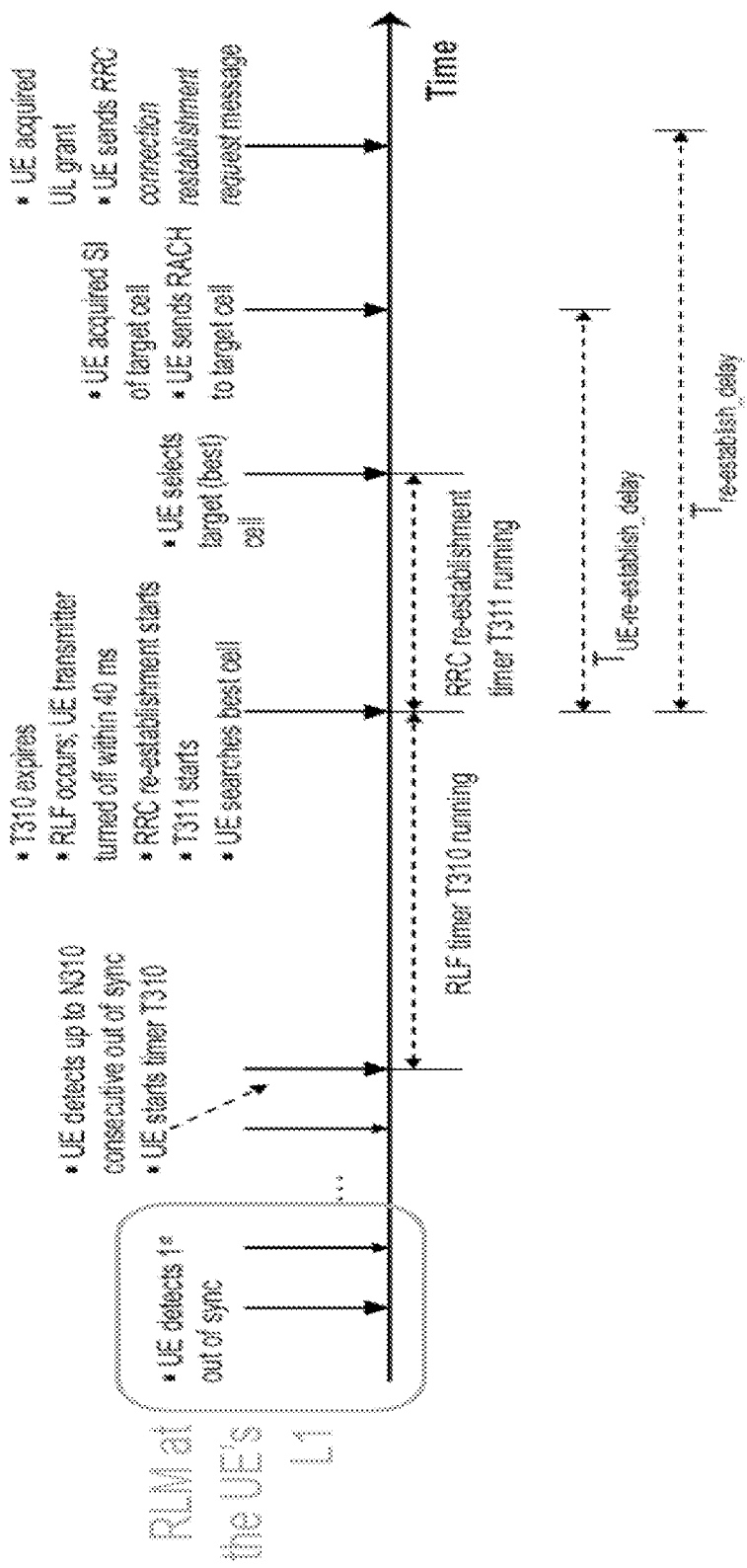
FIG. 2 illustrates higher layer radio link monitoring (RLM) procedures in LTE.
Figure 15:
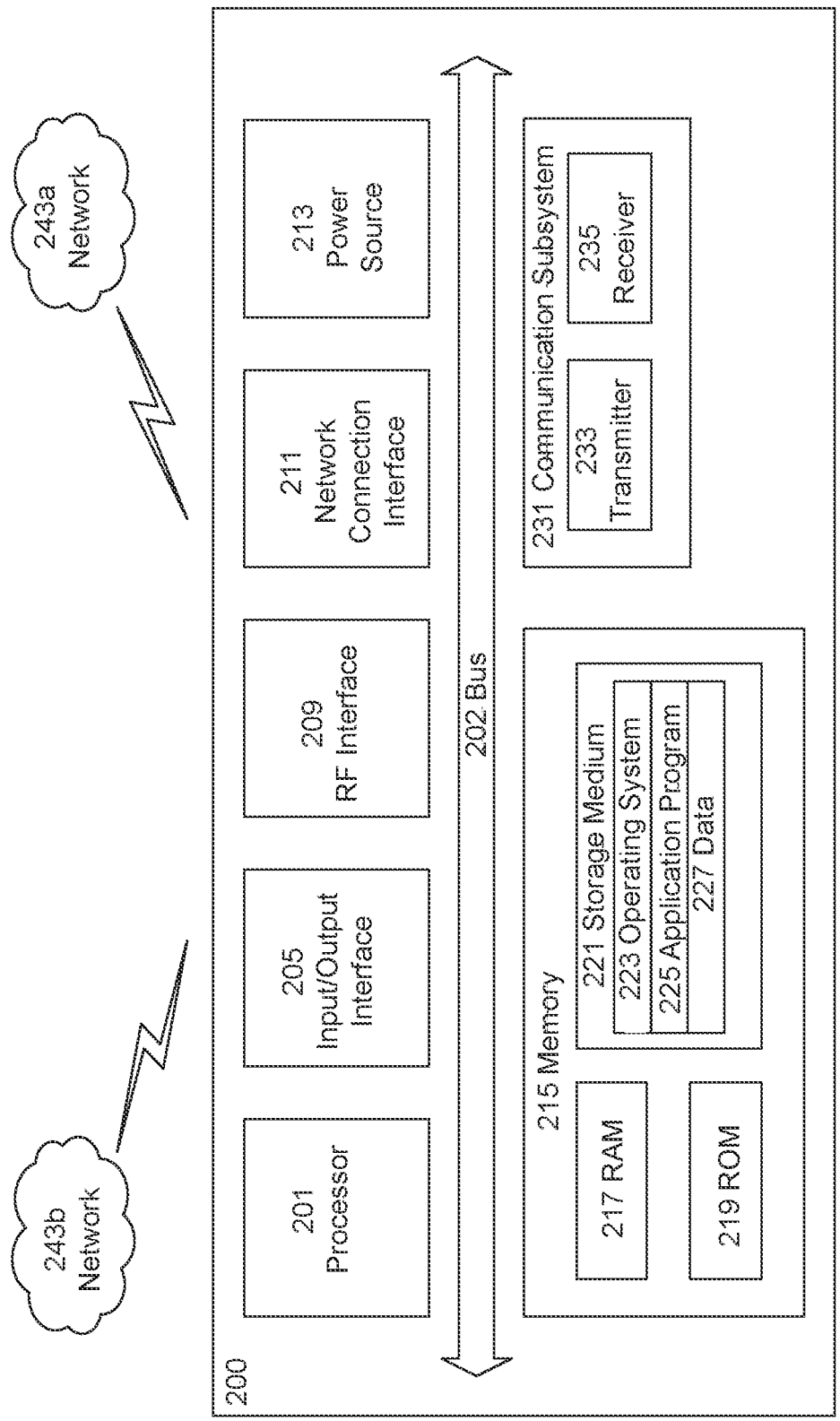
FIG. 15 illustrates an example user equipment, according to certain embodiments.

FIG. 15 illustrates an example UE 200, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 2, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 15, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 16:
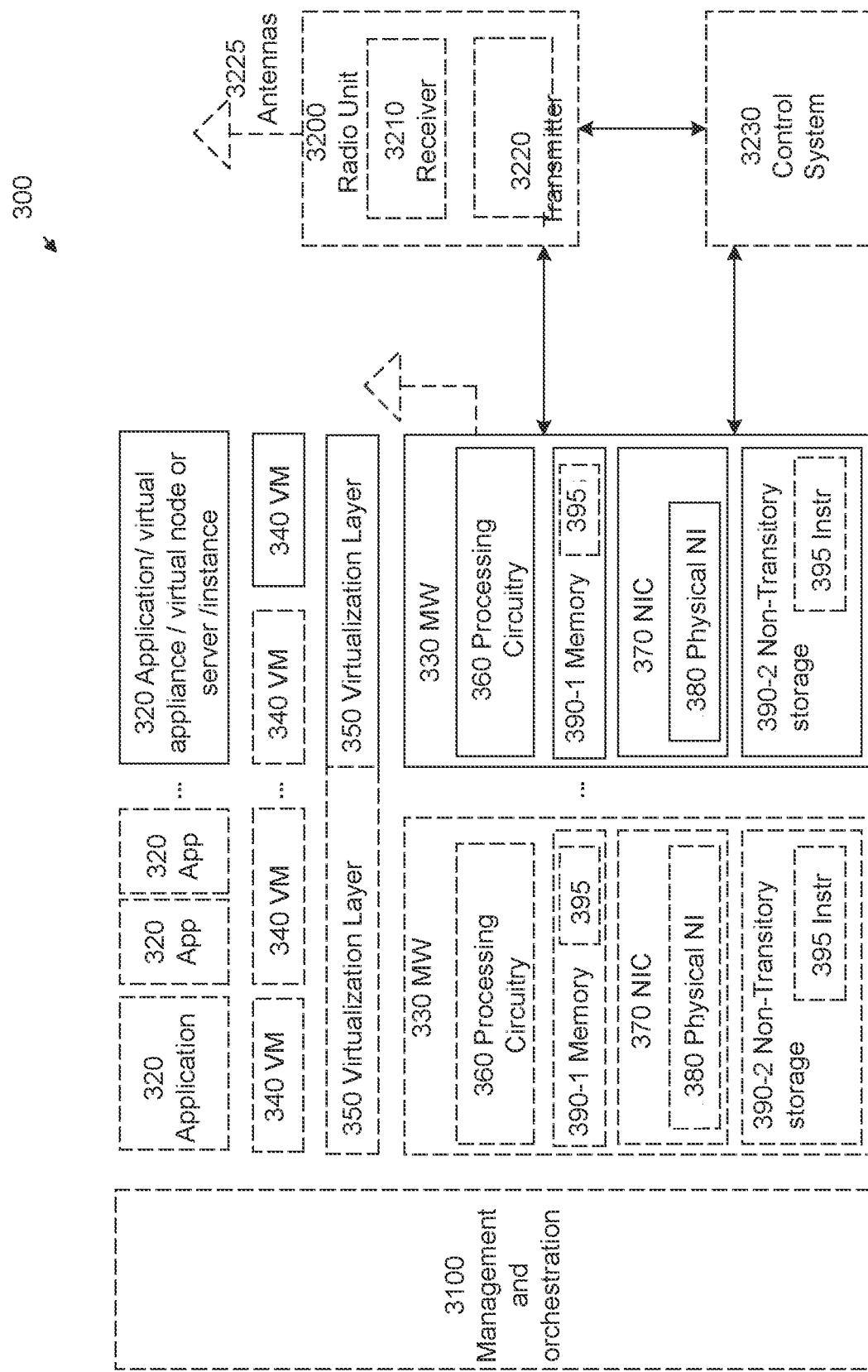
FIG. 16 illustrates an example virtualization environment in which functions implemented by some embodiments may be virtualized, according to certain embodiments.

FIG. 16 illustrates an example virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

Figure 3:
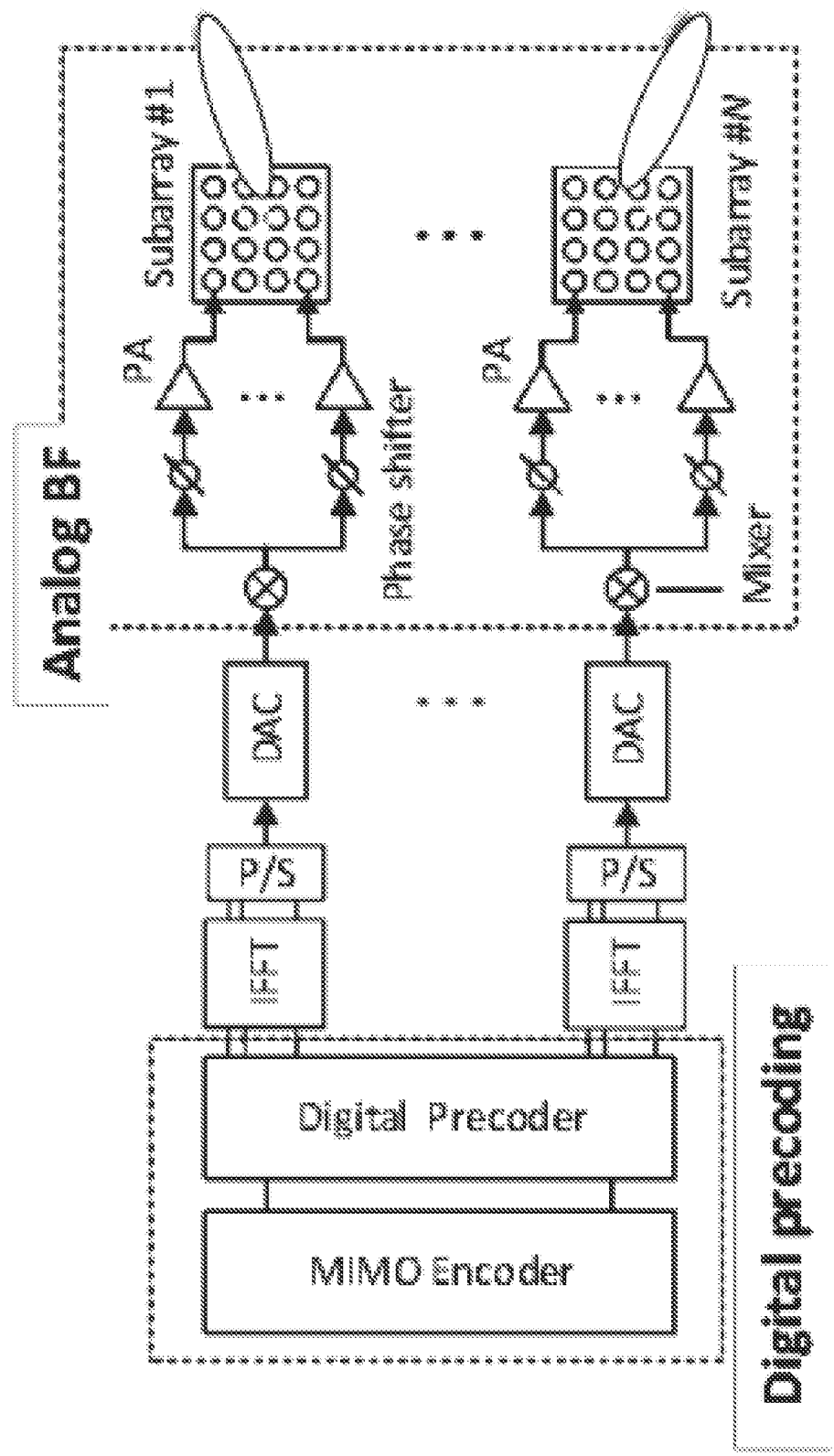
FIG. 3 illustrates an example diagram for hybrid beamforming.
Figure 5:
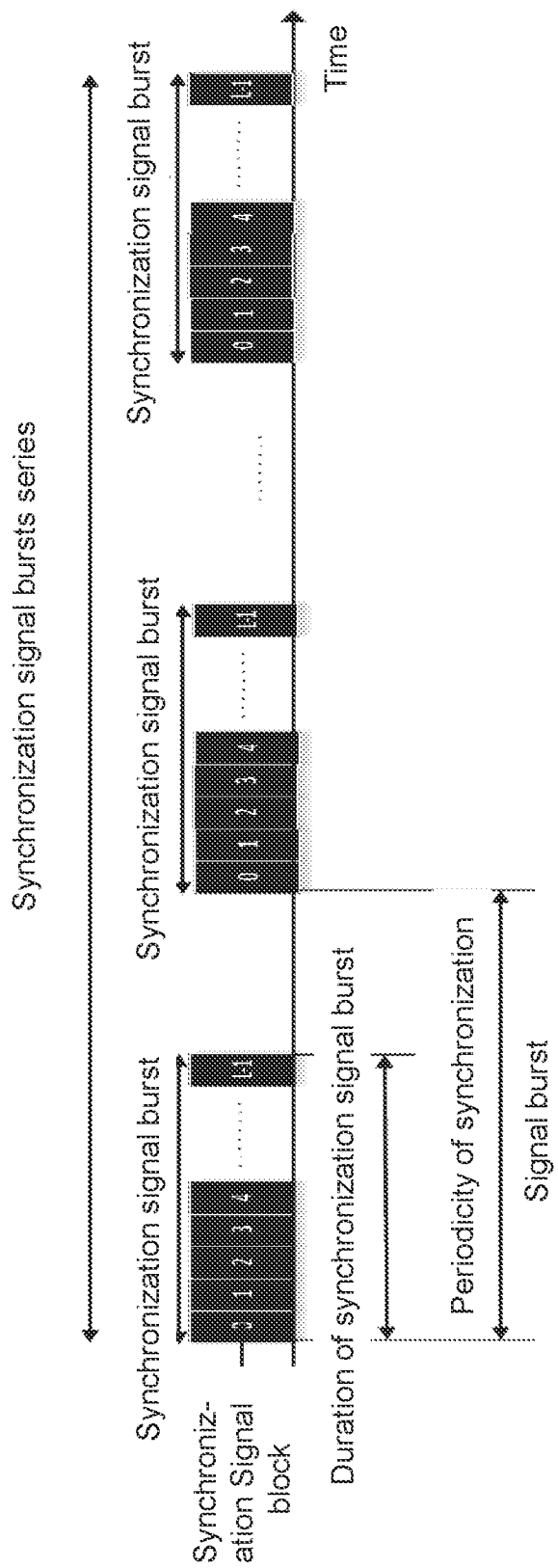
FIG. 5 illustrates an example configuration of synchronization signal (SS) blocks, SS bursts, and SS burst sets/series.
Figure 6:
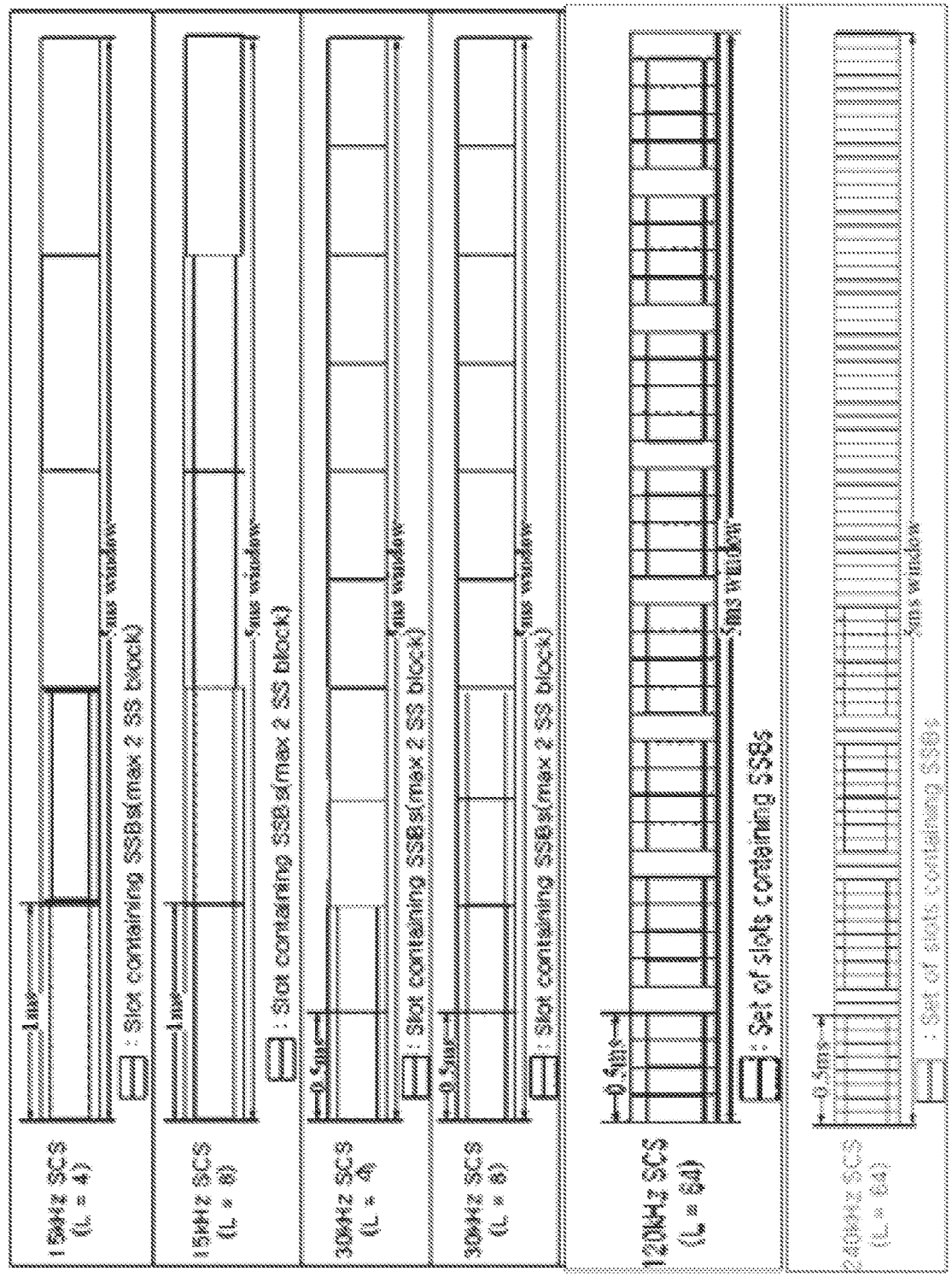
FIG. 6 illustrates an example mapping for SS blocks within a time slot and within the 5 ms window.
Figure 7:
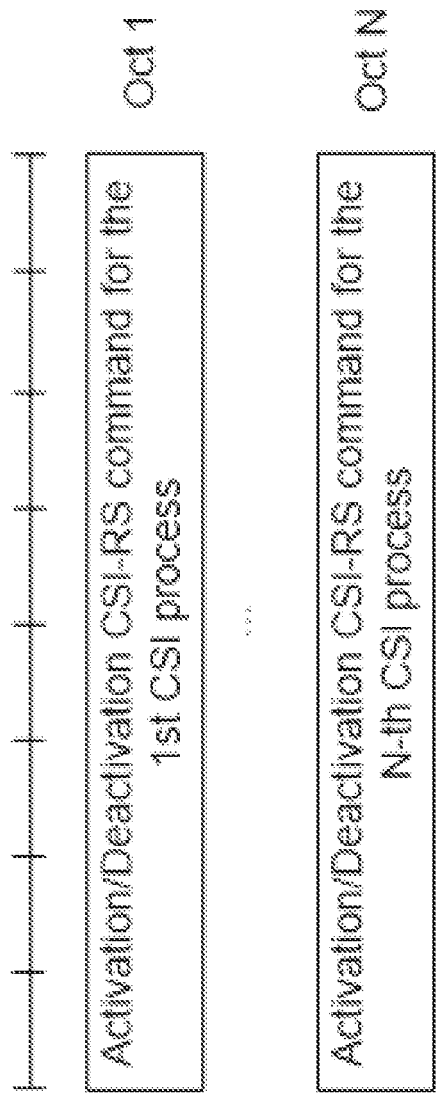
FIG. 7 illustrates activation/deactivation of CSI-RS resources by MAC Control element.

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 17:
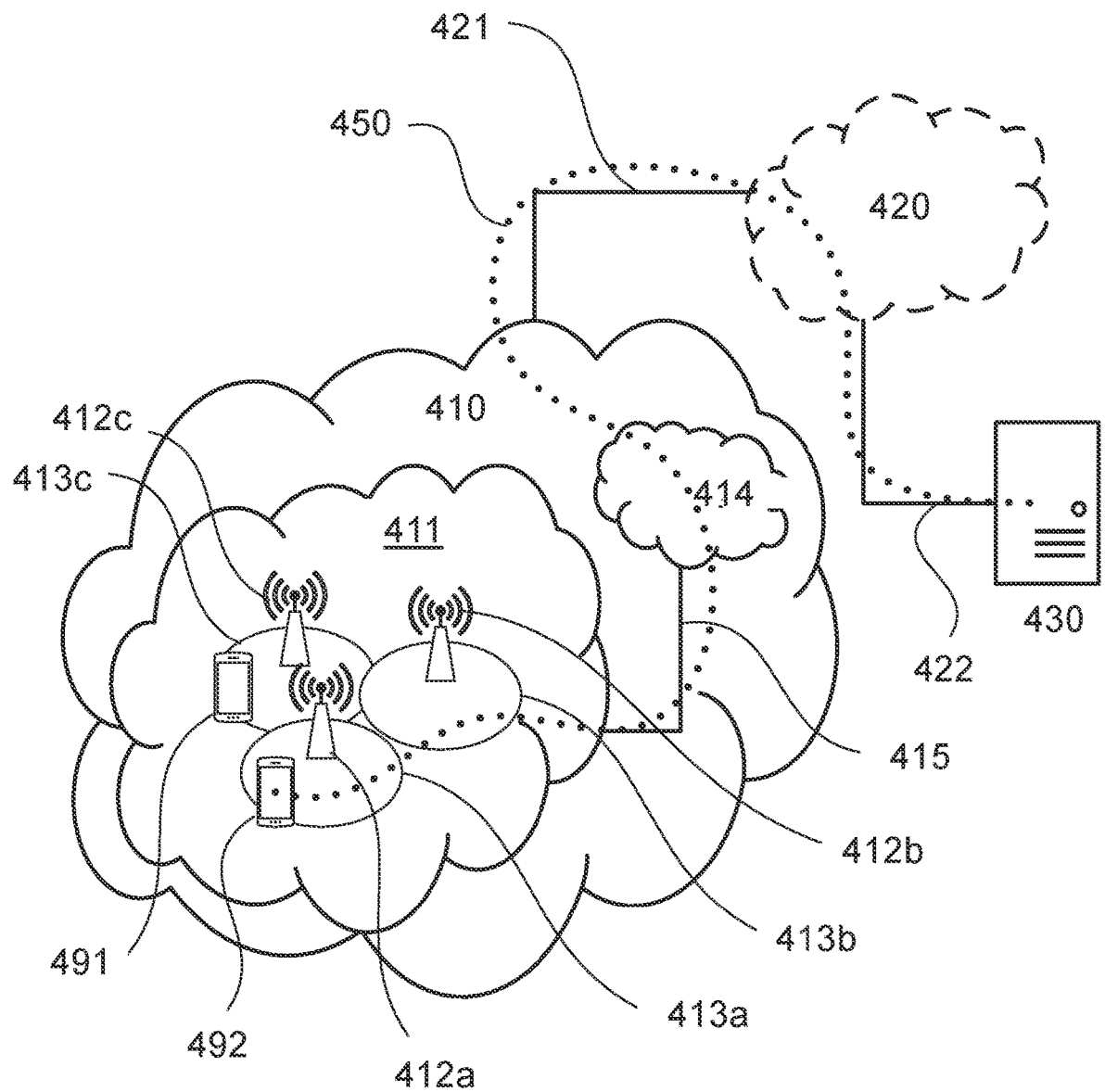
FIG. 17 illustrates a telecommunication network connected via an intermediate network to a host computer, according to certain embodiments.

FIG. 17 illustrates a telecommunications network connected via an intermediate network to a host computer in accordance with some embodiments. With reference to FIG. 17, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 18:
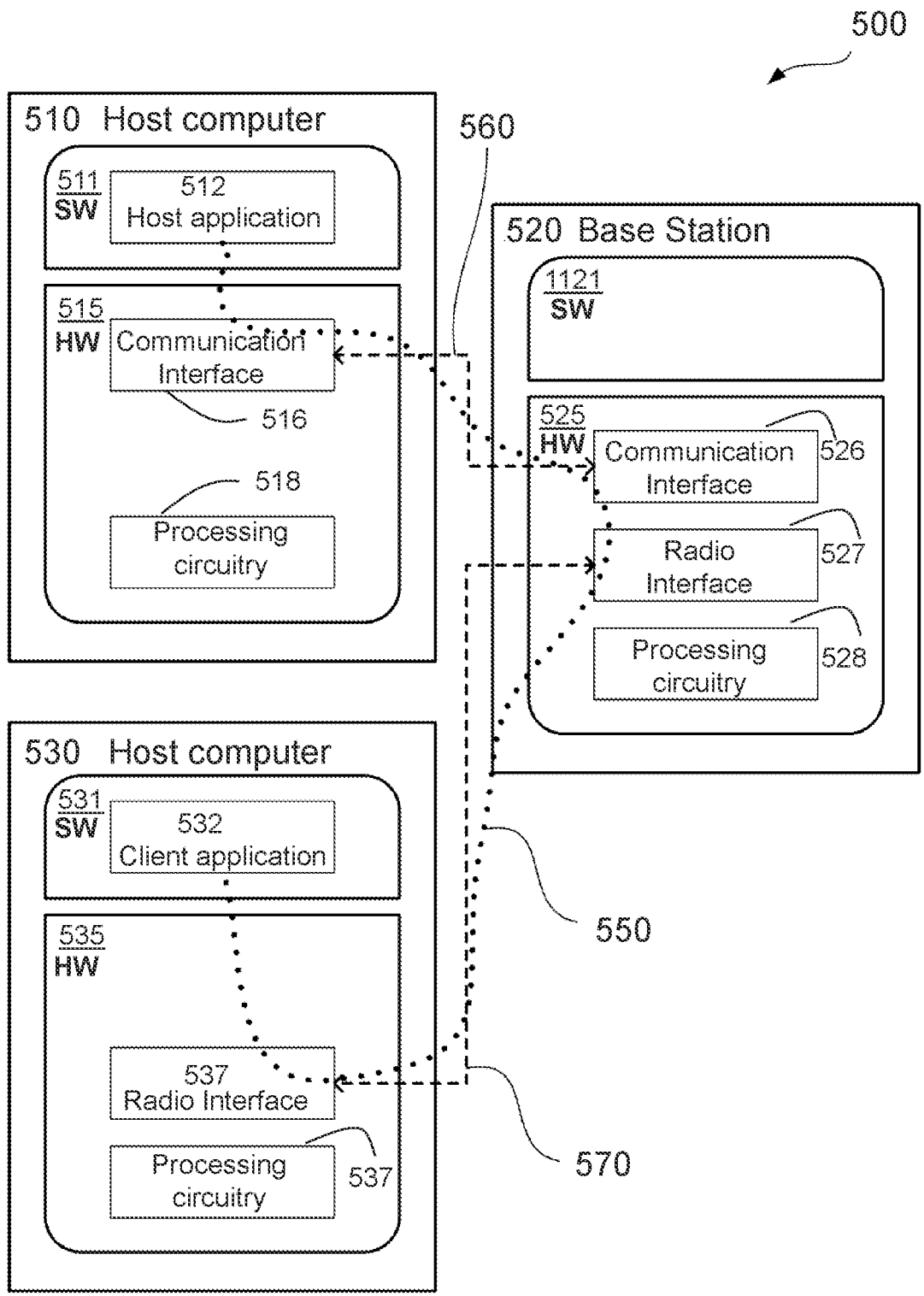
FIG. 18 illustrates a generalized block diagram of a host computer communicating via a base station with a user equipment over a partially wireless connection, according to certain embodiments.

FIG. 18 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 18. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 18) served by base station 520. Communication interface 526 may be configured to facilitate connection 560 to host computer 510. Connection 560 may be direct or it may pass through a core network (not shown in FIG. 18) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 18 may be similar or identical to host computer 430, one of base stations 412a, 412b, 412c and one of UEs 491, 492 of FIG. 4, respectively. This is to say, the inner workings of these entities may be as shown in FIG. 18 and independently, the surrounding network topology may be that of FIG. 4.

In FIG. 18, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve RRC signaling by minimizing or avoiding the RRC signaling due to intra-cell mobility. This may provide benefits such as an improved user experience and better usage of wireless resources.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 19, 20:
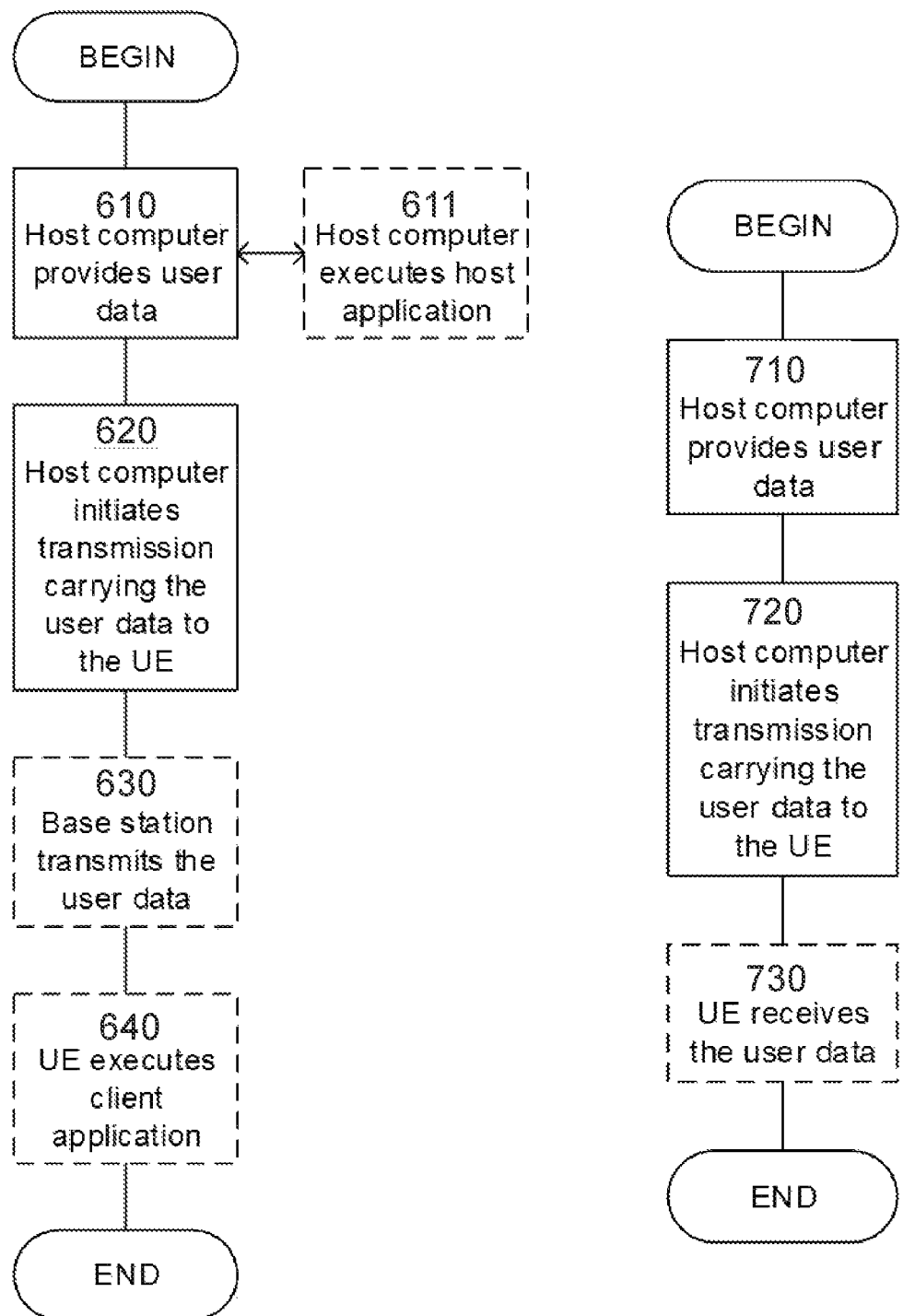
FIG. 19 illustrates a method implemented in a communication system, according to one embodiment.
FIG. 20 illustrates another method implemented in a communication system, according to one embodiment.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 21, 22:
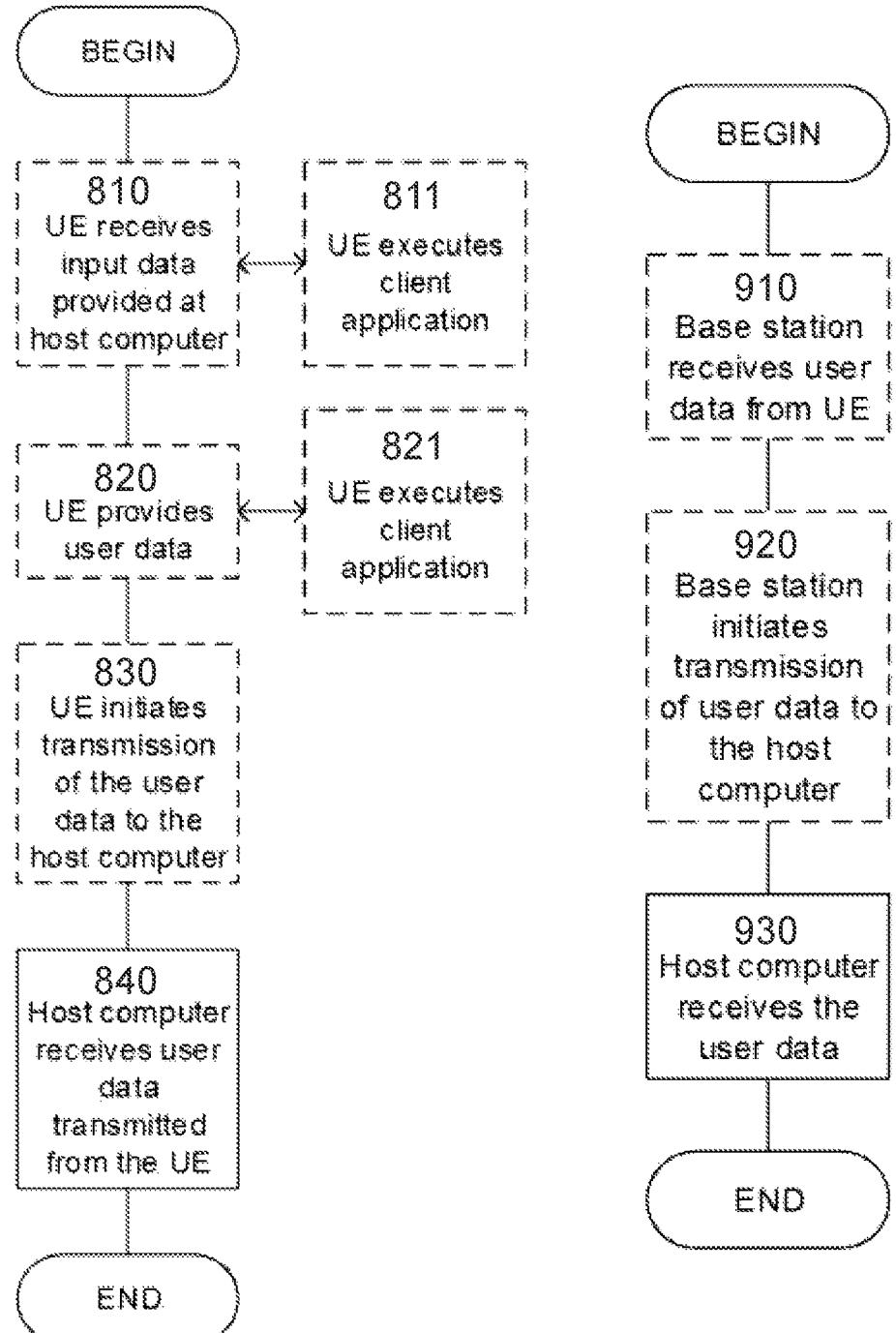
FIG. 21 illustrates another method implemented in a communication system, according to one embodiment.
FIG. 22 illustrates another method implemented in a communication system, according to one embodiment.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 23:
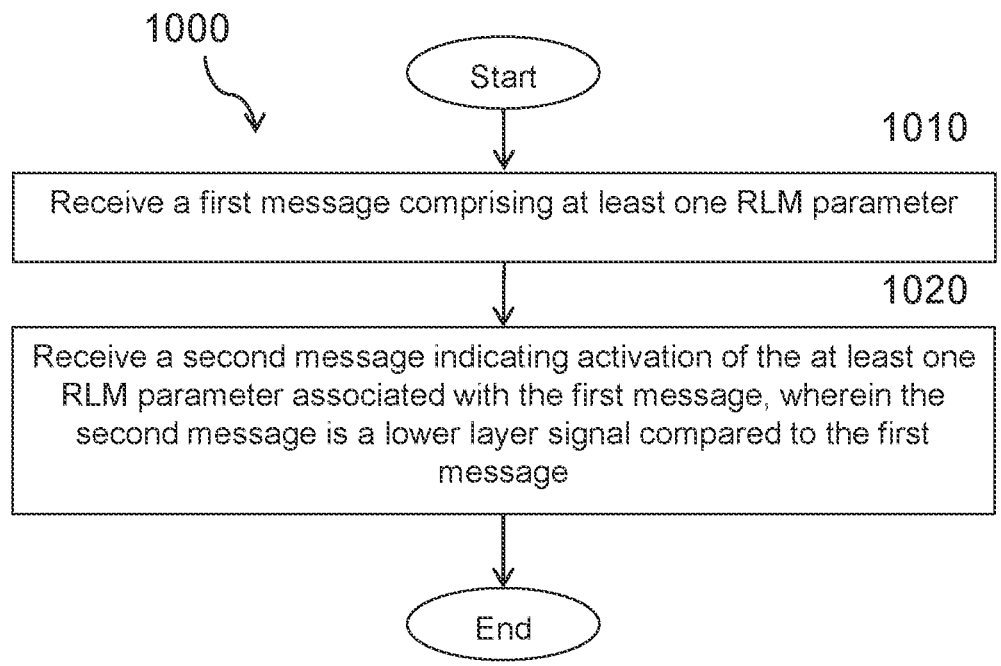
FIG. 23 illustrates an example method by a wireless device for optimized reconfiguration of RLM and beam monitoring, according to certain embodiments.

FIG. 23 illustrates an exemplary method 1000 by a wireless device 110 for optimized reconfiguration of RLM and beam monitoring, in accordance with certain embodiments. The method begins at step 1010 when the wireless device 110 receives, from a first network node 160, a first message comprising at least one RLM parameter. At step 1020, the wireless device 110 receives, from the first network node 160, a second message indicating activation of at least one RLM parameter associated with the first message. The second message is a lower layer signal compared to the first message.

According to a particular embodiment, the first message is received as a radio resource control, RRC, signal and the second message is received as a medium access control, MAC, control element.

According to a particular embodiment, the at least one RLM parameter includes a first RLM parameter and a second RLM parameter. The first RLM parameter is associated with a first set of reference signal resources, and the second RLM parameter is associated with a second set of reference signal resources. The second set of reference signal resources is different from the first set of reference signal resources.

According to a particular embodiment, each of the first set of reference signal resources and the second set of reference signal resources are less than a number of reference signal resources providing coverage of a cell.

According to a particular embodiment, the method further includes the wireless device 110 performing RLM of at least one reference signal resource based on the second message, and the at least one reference signal resource comprises at least one synchronization signal block, SSB, or at least one channel state information-reference signal, CSI-RS.

In a particular embodiment, in response to receiving the second message, the wireless device 110 deactivates at least one reference signal resource in the first set of reference signal resources.

In a particular embodiment, in response to receiving the second message, the wireless device 110 activates at least one reference signal resource that in not in the first set of reference signal resources.

In a particular embodiment, the first message identifies a reference signal type, and the second message identifies one or more reference signal resources of the reference signal type.

Figure 24:
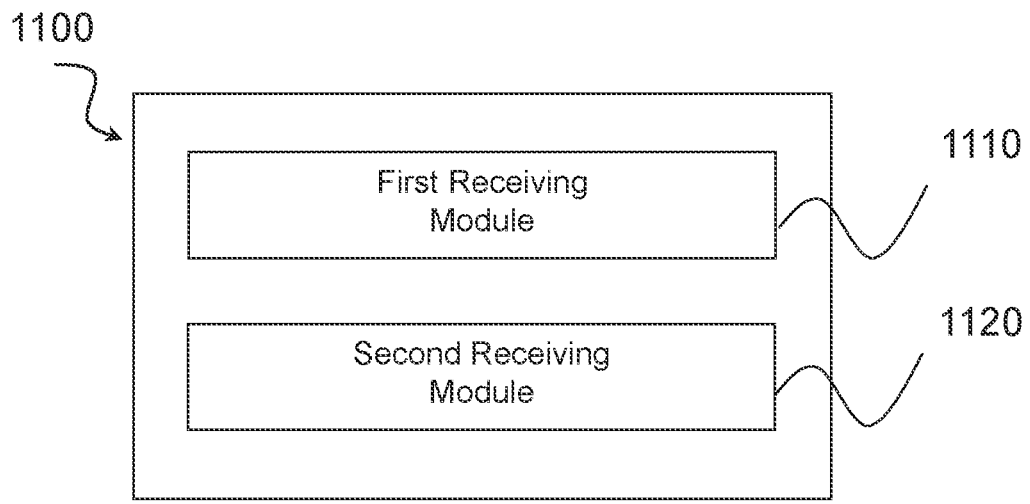
FIG. 24 illustrates an example virtual computing device for optimized reconfiguration of RLM and beam monitoring, according to certain embodiments.

In certain embodiments, the method for optimized reconfiguration of RLM and beam monitoring as described above may be performed by a virtual computing device. FIG. 24 illustrates an example virtual computing device 1100 for optimized reconfiguration of RLM and beam monitoring, according to certain embodiments. In certain embodiments, virtual computing device 1100 may include modules for performing steps similar to those described above with regard to the method illustrated and described in FIG. 23. For example, virtual computing device 1100 may include a first receiving module 1110, a second receiving module 1120, and any other suitable modules for optimized reconfiguration of RLM and beam monitoring. In some embodiments, one or more of the modules may be implemented using one or more processors 170 of FIG. 13. In certain embodiments, the functions of two or more of the various modules may be combined into a single module.

The first receiving module 1110 may perform certain of the receiving functions of virtual computing device 1100. For example, in a particular embodiment, first receiving module 1110 may receive, from a first network node 160, a first message comprising at least one RLM parameter.

The second receiving module 1120 may perform certain other of the receiving functions of virtual computing device 1100. For example, in a particular embodiment, second receiving module 1110 may receive, from the first network node 160, a second message indicating activation of at least one RLM parameter associated with the first message. The second message is a lower layer signal compared to the first message.

Other embodiments of virtual computing device 1100 may include additional components beyond those shown in FIG. 24 that may be responsible for providing certain aspects of the wireless device's functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 25:
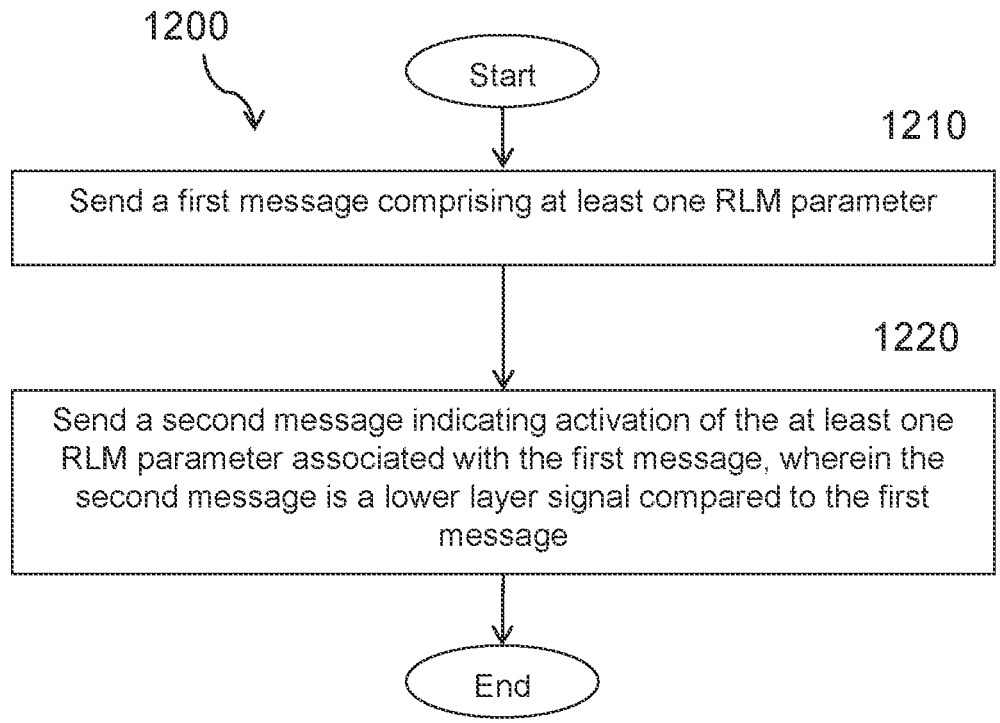
FIG. 25 illustrates an exemplary method by a network node for optimized reconfiguration of RLM and beam monitoring, according to certain embodiments.

FIG. 25 illustrates an exemplary method 1200 by a network node 160 for optimized reconfiguration of RLM and beam monitoring, in accordance with certain embodiments. The method begins at step 1210 when the network node 160 sends, to a wireless device 110, a first message comprising at least one RLM parameter. At step 1220, the network node 160 sends, to the wireless device 110, a second message indicating activation of at least one RLM parameter associated with the first message. The second message is a lower layer signal compared to the first message.

According to a particular embodiment, the first message is sent as a radio resource control, RRC, signal and the second message is sent as a medium access control, MAC, control element.

According to a particular embodiment, the at least one RLM parameter is associated with at least one synchronization signal block, SSB, or at least one channel state information-reference signal, CSI-RS.

According to a particular embodiment, the second message is sent to the wireless device in response to determining that the wireless device has moved within a cell.

According to a particular embodiment, the first message identifies a reference signal type, and the second message identifies one or more reference signal resources of the reference signal type.

According to a particular embodiment, the at least one RLM parameter comprises a first RLM parameter and a second RLM parameter. The first RLM parameter is associated with a first set of reference signal resources, and the second RLM parameter is associated with a second set of reference signal resources. The second set of reference signal resources is different from the first set of reference signal resources.

According to a particular embodiment, each of the first set of reference signal resources and the second set of reference signal resources are less than a number of reference signal resources providing coverage of a cell.

Figure 26:
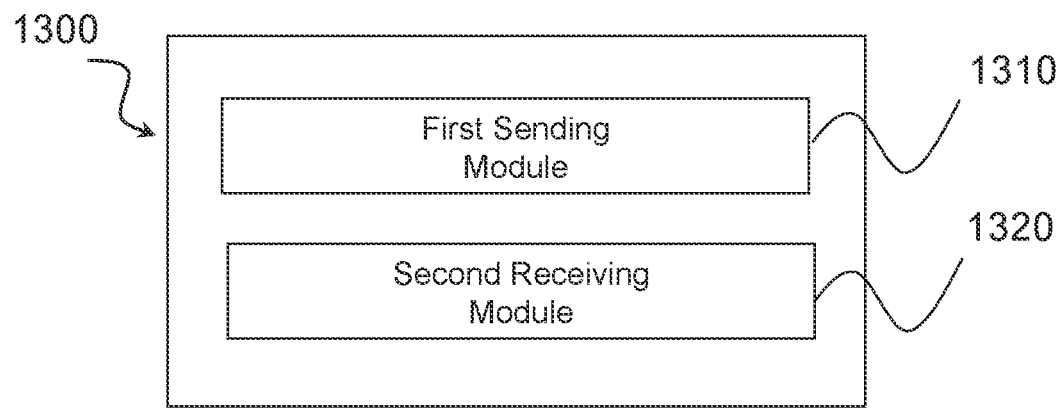
FIG. 26 illustrates another example virtual computing device for optimized reconfiguration of RLM and beam monitoring, according to certain embodiments.

In certain embodiments, the method for optimized reconfiguration of RLM and beam monitoring as described above may be performed by a virtual computing device. FIG. 26 illustrates an example virtual computing device 1300 for optimized reconfiguration of RLM and beam monitoring, according to certain embodiments. In certain embodiments, virtual computing device 1300 may include modules for performing steps similar to those described above with regard to the method illustrated and described in FIG. 25. For example, virtual computing device 1100 may include a first sending module 1310, a second sending module 1320, and any other suitable modules for optimized reconfiguration of RLM and beam monitoring. In some embodiments, one or more of the modules may be implemented using one or more processors 120 of FIG. 14. In certain embodiments, the functions of two or more of the various modules may be combined into a single module.

The first sending module 1310 may perform certain of the sending functions of virtual computing device 1300. For example, in a particular embodiment, first sending module 1310 may send, to a wireless device 110, a first message comprising at least one RLM parameter.

The second sending module 1320 may perform certain other of the sending functions of virtual computing device 1300. For example, in a particular embodiment, second sending module 1310 may send, to the wireless device 110, a second message indicating activation of at least one RLM parameter associated with the first message. The second message is a lower layer signal compared to the first message.

Other embodiments of virtual computing device 1300 may include additional components beyond those shown in FIG. 26 that may be responsible for providing certain aspects of the network node's functionality, including any of the functionality described above and/or any additional functionality (including any functionality necessary to support the solutions described above). The various different types of network nodes 160 may include components having the same physical hardware but configured (e.g., via programming) to support different radio access technologies, or may represent partly or entirely different physical components.

Some additional example embodiments are now described:

Group A Embodiments

Embodiment 1. A method performed by a wireless device for optimized reconfiguration of RLM and beam monitoring, the method comprising:
  Receiving a first configuration message comprising RLM parameters;
  Receiving a second configuration message comprising updated RLM parameters, wherein the second configuration message is a lower layer signal compared to the first configuration message.

Embodiment 2. The method of 1 further comprising any combination of any of the steps, procedures or benefits described above.

Embodiment 3. The method of any of the previous embodiments, further comprising:
  providing user data; and
  forwarding the user data to a host computer via the transmission to the base station.

Group B Embodiments

Embodiment 4. A method performed by a base station for optimized reconfiguration of RLM and beam monitoring, the method comprising:
  Sending a first configuration message comprising RLM parameters;
  Detecting a need to update RLM parameters; and
  Sending a second configuration message comprising updated RLM parameters, wherein the second configuration message is a lower layer signal compared to the first configuration message.

Embodiment 5. The method of 4 further comprising any combination of any of the steps, procedures or benefits described above.

Embodiment 6. The method of any of the previous embodiments, further comprising:
  obtaining user data; and
  forwarding the user data to a host computer or a wireless device.

Group C Embodiments

Embodiment 7. A wireless device for optimized reconfiguration of RLM and beam monitoring, the wireless device comprising:
  processing circuitry configured to perform any of the steps of any of the Group A embodiments; and
  power supply circuitry configured to supply power to the wireless device.

Embodiment 8. A base station for optimized reconfiguration of RLM and beam monitoring, the base station comprising:
  processing circuitry configured to perform any of the steps of any of the Group B embodiments;
  power supply circuitry configured to supply power to the wireless device.

Embodiment 9. A user equipment (UE) for optimized reconfiguration of RLM and beam monitoring, the UE comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

Embodiment 10. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B embodiments.

Embodiment 11. The communication system of the previous embodiment further including the base station.

Embodiment 12. The communication system of the previous 2 embodiments, further including the UE, wherein the UE is configured to communicate with the base station.

Embodiment 13. The communication system of the previous 3 embodiments, wherein:
  the processing circuitry of the host computer is configured to execute a host application, thereby providing the user data; and
  the UE comprises processing circuitry configured to execute a client application associated with the host application.

Embodiment 14. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of the Group B embodiments.

Embodiment 15. The method of the previous embodiment, further comprising, at the base station, transmitting the user data.

Embodiment 16. The method of the previous 2 embodiments, wherein the user data is provided at the host computer by executing a host application, the method further comprising, at the UE, executing a client application associated with the host application.

Embodiment 17. A user equipment (UE) configured to communicate with a base station, the UE comprising a radio interface and processing circuitry configured to performs the of the previous 3 embodiments.

Embodiment 18. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps of any of the Group A embodiments.

Embodiment 19. The communication system of the previous embodiment, wherein the cellular network further includes a base station configured to communicate with the UE.

Embodiment 20. The communication system of the previous 2 embodiments, wherein:
  the processing circuitry of the host computer is configured to execute a host application, thereby providing the user data; and
  the UE's processing circuitry is configured to execute a client application associated with the host application.

Embodiment 21. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE performs any of the steps of any of the Group A embodiments.

Embodiment 22. The method of the previous embodiment, further comprising at the UE, receiving the user data from the base station.

Embodiment 23. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

Embodiment 24. The communication system of the previous embodiment, further including the UE.

Embodiment 25. The communication system of the previous 2 embodiments, further including the base station, wherein the base station comprises a radio interface configured to communicate with the UE and a communication interface configured to forward to the host computer the user data carried by a transmission from the UE to the base station.

Embodiment 26. The communication system of the previous 3 embodiments, wherein:
the processing circuitry of the host computer is configured to execute a host application; and
the UE's processing circuitry is configured to execute a client application associated with the host application, thereby providing the user data.

Embodiment 27. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

Embodiment 28. A method implemented in a communication system including a host computer, a base station and a user equipment (UE), the method comprising:
at the host computer, receiving user data transmitted to the base station from the UE, wherein the UE performs any of the steps of any of the Group A embodiments.

Embodiment 29. The method of the previous embodiment, further comprising, at the UE, providing the user data to the base station.

Embodiment 30. The method of the previous 2 embodiments, further comprising:
at the UE, executing a client application, thereby providing the user data to be transmitted; and
at the host computer, executing a host application associated with the client application.

Embodiment 31. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

Embodiment 32. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

Embodiment 33. The communication system of the previous embodiment further including the base station.

Embodiment 34. The communication system of the previous 2 embodiments, further including the UE, wherein the UE is configured to communicate with the base station.

Embodiment 35. The communication system of the previous 3 embodiments, wherein:
the processing circuitry of the host computer is configured to execute a host application;
the UE is configured to execute a client application associated with the host application, thereby providing the user data to be received by the host computer.

Embodiment 36. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

Embodiment 37. The method of the previous embodiment, further comprising at the base station, receiving the user data from the UE.

Embodiment 38. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for optimized reconfiguration of radio link monitoring (RLM) and beam monitoring, the method comprising:
   receiving at the wireless device, from a first network node, a first message comprising a plurality of RLM parameters associated with a plurality of reference signals;
   receiving, from the first network node, a second message indicating activation of a previously inactive RLM parameter, with respect to the wireless device, the activated RLM parameter being one of the plurality of RLM parameters associated with the first message, wherein the activated at least one RLM parameter is associated with at least a first reference signal; and
   monitoring one or more reference signals associated with the at least one RLM parameter.

2. The method of claim 1, wherein:
   the plurality of RLM parameters comprises a first RLM parameter and a second RLM parameter,
   the first RLM parameter being associated with a first set of reference signal resources,
   the second RLM parameter being associated with a second set of reference signal resources, and
   the second set of reference signal resources is different from the first set of reference signal resources.

3. The method of claim 2, wherein each of the first set of reference signal resources and the second set of reference signal resources are less than a number of reference signal resources providing coverage of a cell.

4. The method of claim 2, further comprising, in response to receiving the second message, deactivating at least one reference signal resource in the first set of reference signal resources.

5. The method of claim 2, further comprising, in response to receiving the second message, activating at least one reference signal resource that is not in the first set of reference signal resources.

6. A wireless device for optimized reconfiguration of radio link monitoring, RLM, and beam monitoring, the wireless device comprising:
a wireless interface configured to:
receive at the wireless device, from a first network node, a first message comprising a plurality of RLM parameters associated with a plurality of reference signals; and
receive, from the first network node, a second message indicating activation of a previously inactive RLM parameter, with respect to the wireless device, the activated RLM parameter being one of the plurality of RLM parameters associated with the first message, wherein the activated at least one RLM parameter is associated with at least a first reference signal; and
processing circuitry coupled to the wireless interface and configured to monitor one or more reference signals associated with the at least one RLM parameter.

7. The wireless device of claim 6, wherein:
the plurality of RLM parameters comprises a first RLM parameter and a second RLM parameter,
the first RLM parameter being associated with a first set of reference signal resources,
the second RLM parameter being associated with a second set of reference signal resources, and
the second set of reference signal resources is different from the first set of reference signal resources.

8. The wireless device of claim 7, wherein each of the first set of reference signal resources and the second set of reference signal resources are less than a number of reference signal resources providing coverage of a cell.

9. The wireless device of claim 7, wherein the processing circuitry is further operable to, in response to receiving the second message, deactivate at least one reference signal resource in the first set of reference signal resources.

10. The wireless device of claim 7, wherein the processing circuitry is further operable to in response to receiving the second message, activate at least one reference signal resource that is not in the first set of reference signal resources.

11. A method performed by a network node for optimized reconfiguration of radio link monitoring, RLM, and beam monitoring, the method comprising:
sending, to a wireless device, a first message comprising a plurality of RLM parameters associated with a plurality of reference signals to be used by the wireless device for monitoring one or more reference signals;
sending, to the wireless device, a second message indicating activation of a previously inactive RLM parameter, with respect to the wireless device, the activated RLM parameter being one of the plurality of RLM parameters associated with the first message, wherein the activated at least one RLM parameter is associated with at least a first reference signal; and
transmitting one or more reference signals associated with the at least one RLM parameter.

12. The method of claim 11, wherein the second message is sent to the wireless device in response to determining that the wireless device has moved within a cell.

13. A network node for optimized reconfiguration of radio link monitoring, RLM, and beam monitoring, the network node comprising:
processing circuitry; and
a wireless interface coupled to the processing circuitry and configured to:
send, to a wireless device, a first message comprising a plurality of RLM parameters associated with a plurality of reference signals to be used by the wireless device for monitoring one or more reference signals;
send, to the wireless device, a second message indicating activation of a previously inactive RLM parameter, with respect to the wireless device, the activated RLM parameter being one of the plurality of RLM parameters associated with the first message, wherein the activated at least one RLM parameter is associated with at least a first reference signal; and
transmit one or more reference signals associated with the at least one RLM parameter.

14. The network node of claim 13, wherein the processing circuitry is configured to determine that the wireless device has moved within a cell and wherein the second message is sent to the wireless device in response to the processing circuitry determining that the wireless device has moved within the cell.

15. The network node of claim 13, wherein:
the plurality of RLM parameters comprises a first RLM parameter and a second RLM parameter,
the first RLM parameter being associated with a first set of reference signal resources,
the second RLM parameter being associated with a second set of reference signal resources, and
the second set of reference signal resources is different from the first set of reference signal resources.

16. The network node of claim 15, wherein each of the first set of reference signal resources and the second set of reference signal resources are less than a number of reference signal resources providing coverage of a cell.

17. The method of claim 15, wherein:
the plurality of RLM parameters comprises a first RLM parameter and a second RLM parameter,
the first RLM parameter being associated with a first set of reference signal resources,
the second RLM parameter being associated with a second set of reference signal resources, and
the second set of reference signal resources is different from the first set of reference signal resources.

18. The method of claim 17, wherein each of the first set of reference signal resources and the second set of reference signal resources are less than a number of reference signal resources providing coverage of a cell.

* * * * *